United States Patent
Gross et al.

(10) Patent No.: US 12,410,090 B2
(45) Date of Patent: Sep. 9, 2025

(54) NON-IOX GLASSES WITH HIGH COEFFICIENT OF THERMAL EXPANSION AND PREFERENTIAL FRACTURE BEHAVIOR FOR THERMAL TEMPERING

(71) Applicant: CORNING INCORPORATED, Corning, NY (US)

(72) Inventors: Timothy Michael Gross, Painted Post, NY (US); Peter Joseph Lezzi, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/203,890

(22) Filed: May 31, 2023

(65) Prior Publication Data

US 2023/0312395 A1    Oct. 5, 2023

Related U.S. Application Data

(63) Continuation of application No. 16/767,191, filed as application No. PCT/US2018/063404 on Nov. 30, 2018, now Pat. No. 11,708,296.

(60) Provisional application No. 62/592,683, filed on Nov. 30, 2017.

(51) Int. Cl.
  *C03C 3/097*    (2006.01)
  *C03B 27/012*   (2006.01)
  *C03C 3/091*    (2006.01)

(52) U.S. Cl.
  CPC ............ *C03C 3/097* (2013.01); *C03B 27/012* (2013.01); *C03C 3/091* (2013.01)

(58) Field of Classification Search
  CPC .................................. C03C 3/097; C03C 3/091
  See application file for complete search history.

(56) References Cited

U.S. PATENT DOCUMENTS

| | | |
|---|---|---|
| 1,951,950 A | 3/1934 | Rising |
| 2,106,527 A | 1/1938 | Hostetter |
| 2,145,119 A | 1/1939 | Littleton |
| 2,177,336 A | 10/1939 | Shaver et al. |
| 3,107,196 A | 10/1963 | Acloque |
| 3,169,900 A | 2/1965 | Ermlich |
| 3,174,839 A | 3/1965 | Long |
| 3,223,499 A | 12/1965 | Cypher et al. |
| 3,223,501 A | 12/1965 | Fredley et al. |
| 3,223,549 A | 12/1965 | Fredley et al. |
| 3,225,349 A | 12/1965 | Thor |
| 3,279,906 A | 10/1966 | Baker |
| 3,287,200 A | 11/1966 | Hess et al. |
| 3,293,015 A | 12/1966 | Fredley et al. |
| 3,332,759 A | 7/1967 | McMaster et al. |
| 3,374,078 A | 3/1968 | Wright |
| 3,409,422 A | 11/1968 | Gulotta |
| 3,423,198 A | 1/1969 | McMaster et al. |
| 3,445,316 A | 5/1969 | Megles |
| 3,449,102 A | 6/1969 | Nedelec et al. |
| 3,497,340 A | 2/1970 | Dennison et al. |
| 3,556,757 A | 1/1971 | Kozlowski et al. |
| 3,558,415 A | 1/1971 | Rieser et al. |
| 3,607,169 A | 9/1971 | Coxe |
| 3,637,453 A | 1/1972 | Simmons |
| 3,673,049 A | 6/1972 | Giffen et al. |
| 3,679,388 A | 7/1972 | Giddings et al. |
| 3,744,921 A | 7/1973 | Weller et al. |
| 3,753,674 A | 8/1973 | Ohlberg et al. |
| 3,776,712 A | 12/1973 | Wilde |
| 3,793,127 A | 2/1974 | Wartenberg |
| 3,794,476 A | 2/1974 | Michalik et al. |
| 3,830,540 A | 8/1974 | Sperry |
| 3,844,758 A | 10/1974 | Wartenberg |
| 3,850,679 A | 11/1974 | Sopko et al. |
| 3,883,339 A | 5/1975 | Michalik et al. |
| 3,890,128 A | 6/1975 | Melling et al. |
| 3,902,884 A | 9/1975 | Harrison |
| 3,929,442 A | 12/1975 | Neely, Jr. |
| 3,931,438 A | 1/1976 | Beall et al. |
| 3,936,291 A | 2/1976 | McMaster |
| 3,973,943 A | 8/1976 | Seymour |
| 3,994,711 A | 11/1976 | McMaster |

(Continued)

FOREIGN PATENT DOCUMENTS

| | | |
|---|---|---|
| AU | 42657/72 A | 11/1973 |
| AU | 05245/73 B2 | 9/1982 |

(Continued)

OTHER PUBLICATIONS

Conway, Jr., Joseph C. et al., "Use of Crack Branching Data for Measuring Near-Surface Residual Stresses in empered Glass," Journal of the American Ceramic Society, vol. 72, No. 9, Sep. 1989, pp. 1584-1587.
Cox, Dr. Chris, "Lecture 3: Complex exponential function, Fourier and Laplace transforms," IMI-NFG's MITT Course on Relaxation Processes in Glass and Polymers Lecture 3, 2010, 25 slides.
Cox, Dr. Chris, "Lecture 4: Differential Equations," IMI-NFG's Min Course on Relaxation Processes in Glass and Polymers Lecture 4, 2010, 24 slides.

(Continued)

*Primary Examiner* — Amber R Orlando
*Assistant Examiner* — Cameron K Miller

(57) ABSTRACT

The disclosure relates to glass compositions with high coefficients of thermal expansion and low fracture toughness designed for thermal tempering. These glasses are ideally suited to produce a "dicing" pattern when thermally tempered, even when thin (<3 mm). Disclosed glasses have high thermal expansions at low and high temperatures to produce increased temper stresses once quenched, coupled with low fracture toughness which promotes crack bifurcation and enhanced frangibility. Methods of making such glasses are also provided.

20 Claims, No Drawings

(56) References Cited

U.S. PATENT DOCUMENTS

| | | |
|---|---|---|
| 4,081,254 A | 3/1978 | Matsumoto et al. |
| 4,091,163 A | 5/1978 | Clausen |
| 4,107,460 A | 8/1978 | Grunza et al. |
| 4,128,690 A | 12/1978 | Boardman et al. |
| 4,194,898 A | 3/1980 | Marsh et al. |
| 4,198,226 A | 4/1980 | Marsh et al. |
| 4,198,463 A | 4/1980 | Greenhalgh |
| 4,204,845 A | 5/1980 | Shields et al. |
| 4,214,886 A | 7/1980 | Shay et al. |
| 4,286,052 A | 8/1981 | Ernsberger |
| 4,300,936 A | 11/1981 | Quillevere et al. |
| 4,314,836 A | 2/1982 | Seymour |
| 4,319,907 A | 3/1982 | Pike |
| 4,332,605 A | 6/1982 | Wright et al. |
| 4,372,774 A | 2/1983 | Cross et al. |
| 4,400,193 A | 8/1983 | Cross et al. |
| 4,470,838 A | 9/1984 | Mcmaster et al. |
| 4,471,024 A | 9/1984 | Pargamin et al. |
| 4,494,972 A | 1/1985 | Marsh et al. |
| 4,516,999 A | 5/1985 | Kiefer et al. |
| 4,662,926 A | 5/1987 | Aratani et al. |
| 4,690,871 A | 9/1987 | Gordon |
| 4,744,676 A | 5/1988 | Lind |
| 4,773,926 A | 9/1988 | Letemps et al. |
| 4,826,525 A | 5/1989 | Chesworth et al. |
| 4,913,720 A | 4/1990 | Gardon et al. |
| 4,973,163 A | 11/1990 | Sakai et al. |
| 4,985,275 A | 1/1991 | Takemura et al. |
| 5,009,694 A | 4/1991 | Nishitani et al. |
| 5,057,375 A | 10/1991 | Gordon |
| 5,071,796 A | 12/1991 | Jones et al. |
| 5,121,329 A | 6/1992 | Crump |
| 5,213,440 A | 5/1993 | Yeh et al. |
| 5,236,488 A | 8/1993 | Vehmas |
| 5,285,517 A | 2/1994 | Wu |
| 5,340,433 A | 8/1994 | Crump |
| 5,500,287 A | 3/1996 | Henderson |
| 5,626,911 A | 5/1997 | Bertin et al. |
| 5,643,649 A | 7/1997 | Hagan et al. |
| 5,654,057 A | 8/1997 | Kitayama et al. |
| 5,676,722 A | 10/1997 | Seidel et al. |
| 5,735,923 A | 4/1998 | Hisaeda |
| 5,795,659 A | 8/1998 | Meelu et al. |
| 5,885,316 A | 3/1999 | Sato et al. |
| 5,931,981 A | 8/1999 | McMaster et al. |
| 5,938,808 A | 8/1999 | McMaster et al. |
| 5,938,810 A | 8/1999 | De Vries et al. |
| 5,939,175 A | 8/1999 | Sugiura |
| 5,972,513 A | 10/1999 | Yoshizawa |
| 6,053,011 A | 4/2000 | Lisec |
| 6,079,227 A | 6/2000 | Yoshizawa et al. |
| 6,094,943 A | 8/2000 | Okuda et al. |
| 6,117,283 A | 9/2000 | Chen et al. |
| 6,183,565 B1 | 2/2001 | Granneman et al. |
| 6,200,665 B1 | 3/2001 | Seto |
| 6,295,842 B1 | 10/2001 | McMaster |
| 6,336,775 B1 | 1/2002 | Morita et al. |
| 6,353,283 B1 | 3/2002 | Ghosh et al. |
| 6,370,917 B1 | 4/2002 | Kato et al. |
| 6,412,309 B1 | 7/2002 | Kajii et al. |
| 6,442,017 B1 | 8/2002 | Ewing et al. |
| 6,461,439 B1 | 10/2002 | Granneman et al. |
| 6,472,800 B2 | 10/2002 | Goda et al. |
| 6,598,427 B1 | 7/2003 | Douche et al. |
| 6,613,685 B1 | 9/2003 | Granneman et al. |
| 6,642,017 B2 | 11/2003 | Weiser |
| 6,656,597 B2 | 12/2003 | Takahara |
| 6,713,180 B1 | 3/2004 | Torr et al. |
| 6,722,160 B1 | 4/2004 | Nemugaki et al. |
| 6,770,851 B2 | 8/2004 | Granneman et al. |
| 6,805,749 B2 | 10/2004 | Granneman et al. |
| 6,826,929 B2 | 12/2004 | Boaz |
| 6,877,250 B2 | 4/2005 | Granneman et al. |
| 6,881,485 B2 | 4/2005 | Kato et al. |
| 6,881,931 B2 | 4/2005 | Vehmas et al. |
| 6,977,710 B2 | 12/2005 | Akiyama et al. |
| 7,022,627 B2 | 4/2006 | Granneman et al. |
| 7,048,488 B1 | 5/2006 | Kuznetsov et al. |
| 7,153,798 B2 | 12/2006 | Bordeaux et al. |
| 7,215,262 B2 | 5/2007 | Suzuki et al. |
| 7,261,939 B2 | 8/2007 | Hallett et al. |
| 7,306,848 B2 | 12/2007 | Tominaga et al. |
| 7,312,156 B2 | 12/2007 | Granneman et al. |
| 7,341,968 B2 | 3/2008 | Yoda et al. |
| 7,367,205 B1 | 5/2008 | Boaz |
| 7,410,355 B2 | 8/2008 | Granneman et al. |
| 7,566,673 B2 | 7/2009 | Kawai |
| 7,666,511 B2 | 2/2010 | Ellison et al. |
| 7,694,532 B1 | 4/2010 | Boaz |
| 7,867,932 B2 | 1/2011 | Beall |
| 7,908,885 B2 | 3/2011 | Devitt |
| 8,074,473 B2 | 12/2011 | Nitschke et al. |
| 8,233,433 B2 | 7/2012 | Kalhan |
| 8,234,883 B2 | 8/2012 | Krall et al. |
| 8,289,342 B2 | 10/2012 | Matsumoto |
| 8,415,013 B2 | 4/2013 | Barefoot et al. |
| 8,524,804 B2 | 9/2013 | Kitano et al. |
| 8,585,463 B2 | 11/2013 | Nakae |
| 8,679,599 B2 | 3/2014 | Grzybowski et al. |
| 8,713,967 B2 | 5/2014 | Danielson et al. |
| 8,713,972 B2 | 5/2014 | Lakota et al. |
| 8,728,961 B2 | 5/2014 | Lautenschlaeger et al. |
| 8,759,238 B2 | 6/2014 | Chapman et al. |
| 8,765,262 B2 | 7/2014 | Gross |
| 8,769,990 B2 | 7/2014 | Saito et al. |
| 8,776,548 B2 | 7/2014 | Dannoux et al. |
| 8,802,581 B2 | 8/2014 | Dejneka et al. |
| 8,821,999 B2 | 9/2014 | Grzybowski et al. |
| 8,854,623 B2 | 10/2014 | Fontaine et al. |
| 8,916,013 B2 | 12/2014 | Hong et al. |
| 8,946,103 B2 | 2/2015 | Dejneka et al. |
| 8,951,927 B2 | 2/2015 | Dejneka et al. |
| 8,997,521 B2 | 4/2015 | Vehmas et al. |
| 9,003,835 B2 | 4/2015 | Lock |
| 9,039,886 B2 | 5/2015 | Gong et al. |
| 9,073,291 B2 | 7/2015 | Bookbinder et al. |
| 9,137,892 B2 | 9/2015 | Bando et al. |
| 9,145,329 B2 | 9/2015 | Drake et al. |
| 9,156,724 B2 | 10/2015 | Gross |
| 9,296,638 B2 | 3/2016 | Lezzi et al. |
| 9,478,449 B2 | 10/2016 | Vermont et al. |
| 9,522,836 B2 | 12/2016 | Gulati et al. |
| 9,552,836 B2 | 1/2017 | Ramakrishnan et al. |
| 9,586,861 B2 | 3/2017 | Borrelli et al. |
| 9,725,359 B2 | 8/2017 | Weber |
| 9,761,828 B2 | 9/2017 | Dabich et al. |
| 9,776,905 B2 | 10/2017 | Maschmeyer et al. |
| 9,783,448 B2 | 10/2017 | Maschmeyer et al. |
| 9,802,853 B2 | 10/2017 | Maschmeyer et al. |
| 9,957,190 B2 | 5/2018 | Finkeldey et al. |
| 9,975,801 B2 | 5/2018 | Maschmeyer et al. |
| 10,005,691 B2 | 6/2018 | Maschmeyer et al. |
| 10,077,204 B2 | 9/2018 | Maschmeyer et al. |
| 10,150,699 B2 | 12/2018 | Baum et al. |
| 10,173,923 B2 | 1/2019 | Kawamoto et al. |
| 10,195,778 B2 | 2/2019 | Wolf et al. |
| 10,253,550 B1 | 4/2019 | Kim et al. |
| 11,097,974 B2 | 8/2021 | Lezzi et al. |
| 2001/0007723 A1 | 7/2001 | Tokumoto |
| 2002/0011481 A1 | 1/2002 | Melson et al. |
| 2002/0145213 A1 | 10/2002 | Liu et al. |
| 2003/0037569 A1 | 2/2003 | Arbab et al. |
| 2003/0177790 A1 | 9/2003 | Langsdorf et al. |
| 2004/0107733 A1 | 6/2004 | Yashizawa |
| 2005/0099618 A1 | 5/2005 | Difoggio et al. |
| 2005/0138892 A1 | 6/2005 | Misonou |
| 2005/0266247 A1 | 12/2005 | Yoshizawa |
| 2006/0054774 A1 | 3/2006 | Yassour et al. |
| 2006/0121281 A1 | 6/2006 | Tamai et al. |
| 2006/0179722 A1 | 8/2006 | Spindler |
| 2006/0191292 A1 | 8/2006 | Carlomagno |
| 2006/0219605 A1 | 10/2006 | Devitt |
| 2006/0238100 A1 | 10/2006 | Miyata et al. |
| 2007/0122580 A1 | 5/2007 | Krall et al. |

(56) References Cited

U.S. PATENT DOCUMENTS

| | | |
|---|---|---|
| 2007/0271957 A1 | 11/2007 | Nakamura et al. |
| 2008/0314403 A1 | 12/2008 | Rebours |
| 2009/0069163 A1 | 3/2009 | Beall |
| 2009/0092472 A1 | 4/2009 | Luo et al. |
| 2009/0220761 A1 | 9/2009 | Dejneka et al. |
| 2010/0035038 A1 | 2/2010 | Barefoot et al. |
| 2010/0084016 A1 | 4/2010 | Aitken et al. |
| 2010/0130251 A1 | 5/2010 | Chu |
| 2010/0162761 A1 | 7/2010 | Carney et al. |
| 2010/0183767 A1 | 7/2010 | Noordam et al. |
| 2010/0279067 A1 | 11/2010 | Sabia et al. |
| 2010/0279068 A1 | 11/2010 | Cook et al. |
| 2010/0300535 A1* | 12/2010 | Aitken .................. C03C 3/091 136/260 |
| 2010/0300536 A1 | 12/2010 | Aitken et al. |
| 2011/0014475 A1 | 1/2011 | Murata |
| 2011/0045961 A1 | 2/2011 | Dejneka et al. |
| 2011/0123832 A1 | 5/2011 | Matsumoto et al. |
| 2011/0123833 A1 | 5/2011 | Endo et al. |
| 2011/0165380 A1* | 7/2011 | Gahagan ................ C03C 3/091 428/156 |
| 2011/0200804 A1 | 8/2011 | Tomamoto et al. |
| 2011/0281093 A1 | 11/2011 | Gulati et al. |
| 2011/0289971 A1 | 12/2011 | Brown et al. |
| 2011/0289972 A1 | 12/2011 | Brown et al. |
| 2012/0052271 A1 | 3/2012 | Gomez et al. |
| 2012/0144867 A1 | 6/2012 | Busch |
| 2012/0145991 A1 | 6/2012 | Nam et al. |
| 2012/0164314 A1 | 6/2012 | Labranche et al. |
| 2012/0194974 A1 | 8/2012 | Weber et al. |
| 2012/0247063 A1 | 10/2012 | Grzybowski et al. |
| 2012/0258250 A1 | 10/2012 | Rodgers |
| 2012/0281279 A1 | 11/2012 | Goto et al. |
| 2012/0291707 A1 | 11/2012 | Granneman |
| 2012/0328843 A1 | 12/2012 | Cleary et al. |
| 2013/0008500 A1 | 1/2013 | Lin et al. |
| 2013/0019639 A1 | 1/2013 | Saito et al. |
| 2013/0047673 A1 | 2/2013 | Lee et al. |
| 2013/0052347 A1 | 2/2013 | Kuznetsov et al. |
| 2013/0059120 A1 | 3/2013 | Shi et al. |
| 2013/0065795 A1 | 3/2013 | Allbritton et al. |
| 2013/0071666 A1 | 3/2013 | Komori et al. |
| 2013/0122284 A1 | 5/2013 | Gross |
| 2013/0122313 A1 | 5/2013 | Gross |
| 2013/0199448 A1 | 8/2013 | Granneman et al. |
| 2013/0255314 A1 | 10/2013 | Allan et al. |
| 2013/0291598 A1 | 11/2013 | Saito et al. |
| 2013/0323444 A1 | 12/2013 | Ehemann et al. |
| 2014/0010992 A1 | 1/2014 | Rendon Granados |
| 2014/0026622 A1 | 1/2014 | Wang |
| 2014/0050912 A1 | 2/2014 | Isono et al. |
| 2014/0053605 A1 | 2/2014 | Mader |
| 2014/0065401 A1 | 3/2014 | Donovan et al. |
| 2014/0106172 A1 | 4/2014 | Dejneka et al. |
| 2014/0113854 A1 | 4/2014 | Ni et al. |
| 2014/0120279 A1 | 5/2014 | Demartino et al. |
| 2014/0141217 A1 | 5/2014 | Gulati et al. |
| 2014/0162000 A1 | 6/2014 | Son et al. |
| 2014/0178663 A1 | 6/2014 | Varshneya et al. |
| 2014/0218867 A1 | 8/2014 | Kim et al. |
| 2014/0230492 A1 | 8/2014 | Murata |
| 2014/0242391 A1 | 8/2014 | Ono et al. |
| 2014/0290310 A1 | 10/2014 | Green |
| 2014/0331716 A1 | 11/2014 | Ahmed et al. |
| 2014/0352355 A1 | 12/2014 | Boudreau et al. |
| 2014/0356605 A1 | 12/2014 | Adib et al. |
| 2014/0370302 A1 | 12/2014 | Amin et al. |
| 2014/0370303 A1 | 12/2014 | Jin et al. |
| 2015/0027169 A1 | 1/2015 | Fredholm |
| 2015/0030827 A1* | 1/2015 | Gomez .................. C03C 21/002 501/67 |
| 2015/0030834 A1 | 1/2015 | Morey et al. |
| 2015/0031752 A1 | 1/2015 | Keil et al. |
| 2015/0037552 A1 | 2/2015 | Mauro |
| 2015/0051061 A1 | 2/2015 | Kiczenski et al. |
| 2015/0052949 A1 | 2/2015 | Bayne et al. |
| 2015/0082834 A1 | 3/2015 | Vehmas et al. |
| 2015/0083200 A1 | 3/2015 | Hickman et al. |
| 2015/0096331 A1 | 4/2015 | Rantala et al. |
| 2015/0158276 A1 | 6/2015 | Thompson et al. |
| 2015/0158757 A1 | 6/2015 | Amma et al. |
| 2015/0166390 A1 | 6/2015 | Cha et al. |
| 2015/0166401 A1 | 6/2015 | Yamamoto |
| 2015/0175469 A1 | 6/2015 | Tabe |
| 2015/0202845 A1 | 7/2015 | Cherekdjian et al. |
| 2015/0218045 A1 | 8/2015 | Balcom et al. |
| 2015/0240038 A1 | 8/2015 | Macedo et al. |
| 2015/0246846 A1 | 9/2015 | Choju et al. |
| 2015/0251353 A1 | 9/2015 | Rodgers et al. |
| 2015/0251377 A1 | 9/2015 | Cleary et al. |
| 2015/0266235 A1 | 9/2015 | Page |
| 2015/0274015 A1 | 10/2015 | Wachinger et al. |
| 2015/0307385 A1 | 10/2015 | Klein et al. |
| 2015/0314571 A1 | 11/2015 | Cites et al. |
| 2015/0329406 A1 | 11/2015 | Kawamoto et al. |
| 2015/0343704 A1 | 12/2015 | Stahl et al. |
| 2015/0368153 A1 | 12/2015 | Pesansky et al. |
| 2016/0002103 A1 | 1/2016 | Wang et al. |
| 2016/0031739 A1 | 2/2016 | Lezzi et al. |
| 2016/0031741 A1 | 2/2016 | Maschmeyer et al. |
| 2016/0031742 A1 | 2/2016 | Maschmeyer et al. |
| 2016/0031743 A1 | 2/2016 | Maschmeyer et al. |
| 2016/0031744 A1 | 2/2016 | Maschmeyer et al. |
| 2016/0031752 A1 | 2/2016 | Maschmeyer et al. |
| 2016/0031753 A1 | 2/2016 | Maschmeyer et al. |
| 2016/0082705 A1 | 3/2016 | Fisher et al. |
| 2016/0168023 A1 | 6/2016 | Baum et al. |
| 2016/0194233 A1 | 7/2016 | Van Pelt |
| 2016/0194239 A1 | 7/2016 | Seto |
| 2016/0207819 A1 | 7/2016 | Cleary et al. |
| 2016/0250825 A1 | 9/2016 | Cleary et al. |
| 2016/0250982 A1 | 9/2016 | Fisher et al. |
| 2016/0281233 A1 | 9/2016 | Granneman et al. |
| 2016/0304352 A1 | 10/2016 | Ozyilmaz et al. |
| 2016/0326051 A1 | 11/2016 | Kim |
| 2017/0008377 A1 | 1/2017 | Fisher et al. |
| 2017/0022100 A1 | 1/2017 | Masters et al. |
| 2017/0072613 A2 | 3/2017 | Bracha et al. |
| 2017/0113440 A1 | 4/2017 | Rickerl et al. |
| 2017/0158543 A1 | 6/2017 | Metz et al. |
| 2017/0174564 A1 | 6/2017 | Cleary et al. |
| 2017/0197870 A1 | 7/2017 | Finkeldey et al. |
| 2017/0226007 A1 | 8/2017 | Garner et al. |
| 2017/0233287 A1 | 8/2017 | Li et al. |
| 2017/0361574 A1 | 12/2017 | Kiczenski et al. |
| 2018/0200955 A1 | 7/2018 | Hoelldorfer et al. |
| 2018/0210308 A1 | 7/2018 | Lam et al. |
| 2018/0250748 A1 | 9/2018 | Page |
| 2018/0304588 A1 | 10/2018 | Harris et al. |
| 2019/0022979 A1 | 1/2019 | Uzzato et al. |
| 2019/0030861 A1 | 1/2019 | Bellman et al. |
| 2019/0160787 A1 | 5/2019 | Bartlow et al. |
| 2019/0161402 A1 | 5/2019 | Harris et al. |
| 2019/0227357 A1 | 7/2019 | Williams et al. |
| 2019/0270284 A1 | 9/2019 | Couillard et al. |
| 2019/0391337 A1 | 12/2019 | Sato |
| 2020/0039146 A1 | 2/2020 | Jahnle et al. |
| 2022/0144682 A1 | 5/2022 | Mclaren et al. |

FOREIGN PATENT DOCUMENTS

| | | |
|---|---|---|
| AU | 05351/29 B2 | 3/1984 |
| CA | 1148742 A | 6/1983 |
| CA | 1176468 A | 10/1984 |
| CA | 2171323 A1 | 1/1996 |
| CN | 1208266 A | 2/1999 |
| CN | 1501892 A | 6/2004 |
| CN | 1693247 A | 11/2005 |
| CN | 1896020 A | 1/2007 |
| CN | 101312919 A | 11/2008 |
| CN | 101671112 A | 3/2010 |
| CN | 101774751 A | 7/2010 |
| CN | 101801869 A | 8/2010 |
| CN | 102112407 A | 6/2011 |

(56) References Cited

FOREIGN PATENT DOCUMENTS

| | | |
|---|---|---|
| CN | 102149649 A | 8/2011 |
| CN | 102503103 A | 6/2012 |
| CN | 102574726 A | 7/2012 |
| CN | 102659305 A | 9/2012 |
| CN | 102863146 A | 1/2013 |
| CN | 103201230 A | 7/2013 |
| CN | 103253857 A | 8/2013 |
| CN | 103319082 A | 9/2013 |
| CN | 103359934 A | 10/2013 |
| CN | 103534216 A | 1/2014 |
| CN | 103781733 A | 5/2014 |
| CN | 103827051 A | 5/2014 |
| CN | 104103385 A | 10/2014 |
| CN | 104144877 A | 11/2014 |
| CN | 104211288 A | 12/2014 |
| CN | 104260569 A | 1/2015 |
| CN | 104295448 A | 1/2015 |
| CN | 104310773 A | 1/2015 |
| CN | 104355530 A | 2/2015 |
| CN | 104364213 A | 2/2015 |
| CN | 104379532 A | 2/2015 |
| CN | 104428262 A | 3/2015 |
| CN | 104479282 A | 4/2015 |
| CN | 104520249 A | 4/2015 |
| CN | 104541233 A | 4/2015 |
| CN | 104583141 A | 4/2015 |
| CN | 104619622 A | 5/2015 |
| CN | 104619662 A | 5/2015 |
| CN | 104781201 A | 7/2015 |
| CN | 105271762 A | 1/2016 |
| CN | 205275454 U | 6/2016 |
| CN | 105980147 A | 9/2016 |
| CN | 106045283 A | 10/2016 |
| CN | 206970472 U | 2/2018 |
| DE | 2233057 A1 | 3/1973 |
| EP | 0173418 A2 | 3/1986 |
| EP | 0413254 A1 | 2/1991 |
| EP | 0426363 A2 | 5/1991 |
| EP | 0441804 A1 | 8/1991 |
| EP | 0882681 A1 | 12/1998 |
| EP | 1215039 A2 | 6/2002 |
| EP | 1245545 A1 | 10/2002 |
| EP | 1380550 A1 | 1/2004 |
| EP | 1414762 A1 | 5/2004 |
| EP | 1533282 A1 | 5/2005 |
| EP | 1925952 A1 | 5/2008 |
| EP | 2543644 A2 | 1/2013 |
| EP | 2782753 A1 | 10/2014 |
| EP | 2819965 A2 | 1/2015 |
| EP | 2853517 A1 | 4/2015 |
| EP | 2876092 A1 | 5/2015 |
| FR | 2326386 A1 | 4/1977 |
| FR | 2936794 A1 | 4/2010 |
| GB | 0996423 A | 6/1965 |
| GB | 1026770 A | 4/1966 |
| GB | 1103192 A | 2/1968 |
| GB | 1112781 A | 5/1968 |
| GB | 1160284 A | 8/1969 |
| GB | 1253681 A | 11/1971 |
| GB | 1282720 A | 7/1972 |
| GB | 1289488 A | 9/1972 |
| GB | 2232978 A | 1/1991 |
| IN | 202420 | 5/2005 |
| IN | 200803022 | 8/2008 |
| IN | 201404365 | 2/2015 |
| IN | 201407444 | 4/2015 |
| JP | 51-103920 A | 9/1976 |
| JP | 55-104935 A | 8/1980 |
| JP | 56-155030 A | 12/1981 |
| JP | 56-155031 A | 12/1981 |
| JP | 57-067035 A | 4/1982 |
| JP | 57-067036 A | 4/1982 |
| JP | 58-088132 A | 5/1983 |
| JP | 58-091042 A | 5/1983 |
| JP | 59-008626 A | 1/1984 |
| JP | 59-008627 A | 1/1984 |
| JP | 59-008628 A | 1/1984 |
| JP | 59-008629 A | 1/1984 |
| JP | 59-008630 A | 1/1984 |
| JP | 59-008631 A | 1/1984 |
| JP | 59-057923 A | 4/1984 |
| JP | 60-171245 A | 9/1985 |
| JP | 61-072637 A | 4/1986 |
| JP | 61-141756 | 6/1986 |
| JP | 62-036030 A | 2/1987 |
| JP | 63-270330 A | 11/1988 |
| JP | 02-102436 A | 4/1990 |
| JP | 02-175624 A | 7/1990 |
| JP | 03-045526 A | 2/1991 |
| JP | 03-271127 A | 12/1991 |
| JP | 05-098626 A | 4/1993 |
| JP | 05-098627 A | 4/1993 |
| JP | 05-098628 A | 4/1993 |
| JP | 05-098629 A | 4/1993 |
| JP | 05-098630 A | 4/1993 |
| JP | 05-098631 A | 4/1993 |
| JP | 05-330835 A | 12/1993 |
| JP | 06-236030 A | 8/1994 |
| JP | 06-336533 A | 12/1994 |
| JP | 07-089739 A | 4/1995 |
| JP | 07-809739 A | 4/1995 |
| JP | 07-157322 A | 6/1995 |
| JP | 07-267664 A | 10/1995 |
| JP | 09-278468 A | 10/1997 |
| JP | 09-301732 A | 11/1997 |
| JP | 11-199257 A | 7/1999 |
| JP | 11-310430 A | 11/1999 |
| JP | 2000-072463 A | 3/2000 |
| JP | 2000-103632 A | 4/2000 |
| JP | 2000-172202 A | 6/2000 |
| JP | 2000-327355 A | 11/2000 |
| JP | 2001-002434 A | 1/2001 |
| JP | 2001-180967 A | 7/2001 |
| JP | 2001-307662 A | 11/2001 |
| JP | 2001-348245 A | 12/2001 |
| JP | 2003-040635 A | 2/2003 |
| JP | 2003-137603 A | 5/2003 |
| JP | 2003-261344 A | 9/2003 |
| JP | 2003-321255 A | 11/2003 |
| JP | 2003-342030 A | 12/2003 |
| JP | 2004-091311 A | 3/2004 |
| JP | 2004-115358 A | 4/2004 |
| JP | 3804115 B2 | 8/2006 |
| JP | 2006-298691 A | 11/2006 |
| JP | 2007-191319 A | 8/2007 |
| JP | 2007-261850 A | 10/2007 |
| JP | 2008-282863 A | 11/2008 |
| JP | 4397196 B2 | 1/2010 |
| JP | 4438126 B2 | 3/2010 |
| JP | 4557606 B2 | 10/2010 |
| JP | 4642107 B2 | 3/2011 |
| JP | 4722371 B2 | 7/2011 |
| JP | 4951838 B2 | 6/2012 |
| JP | 2012-232882 A | 11/2012 |
| JP | 2013-177253 A | 9/2013 |
| JP | 5334005 B2 | 11/2013 |
| JP | 2014-001121 A | 1/2014 |
| JP | 2014-073952 A | 4/2014 |
| JP | 2014-521586 A | 8/2014 |
| JP | 2014-166938 A | 9/2014 |
| JP | 2014-523389 A | 9/2014 |
| JP | 5614607 B2 | 10/2014 |
| JP | 5622069 B2 | 11/2014 |
| JP | 2015-006650 A | 1/2015 |
| JP | 2015-034123 A | 2/2015 |
| JP | 2015-054790 A | 3/2015 |
| JP | 2015-061808 A | 4/2015 |
| JP | 2015-086080 A | 5/2015 |
| JP | 5714701 B2 | 5/2015 |
| JP | 2015-112929 A | 6/2015 |
| JP | 2015-151329 A | 8/2015 |
| JP | 2015-163574 A | 9/2015 |
| KR | 10-0218143 B1 | 9/1999 |
| KR | 10-2002-0061567 A | 7/2002 |

(56) References Cited

FOREIGN PATENT DOCUMENTS

| | | |
|---|---|---|
| KR | 10-0690381 B1 | 3/2007 |
| KR | 10-0909835 B1 | 7/2009 |
| KR | 10-0918577 B1 | 9/2009 |
| KR | 10-0937889 B1 | 1/2010 |
| KR | 10-1000677 B1 | 12/2010 |
| KR | 10-1032825 B1 | 5/2011 |
| KR | 10-2011-0087774 A | 8/2011 |
| KR | 10-2011-0106629 A | 9/2011 |
| KR | 10-2011-0112503 A | 10/2011 |
| KR | 10-1093947 B1 | 12/2011 |
| KR | 10-1120262 B1 | 3/2012 |
| KR | 10-2012-0051220 A | 5/2012 |
| KR | 10-2012-0070450 A | 6/2012 |
| KR | 10-2013-0024484 A | 3/2013 |
| KR | 10-1248380 B1 | 3/2013 |
| KR | 10-1286131 B1 | 7/2013 |
| KR | 10-1413626 B1 | 8/2014 |
| KR | 2014-0095564 A | 8/2014 |
| KR | 10-2014-0110364 A | 9/2014 |
| KR | 10-2014-0135846 A | 11/2014 |
| KR | 2015-0002816 A | 1/2015 |
| KR | 2015-0013166 A | 2/2015 |
| KR | 10-2015-0051166 A | 5/2015 |
| KR | 10-2015-0129302 A | 11/2015 |
| KR | 10-2015-0129703 A | 11/2015 |
| KR | 2015-0129703 A | 11/2015 |
| RU | 2151750 C1 | 6/2000 |
| RU | 2199496 C2 | 2/2003 |
| RU | 2237621 C1 | 10/2004 |
| RU | 2299184 C1 | 5/2007 |
| RU | 2464243 C1 | 10/2012 |
| RU | 254731 A1 | 3/2013 |
| SU | 95854 A1 | 11/1952 |
| SU | 443845 A1 | 9/1974 |
| SU | 537960 A1 | 12/1976 |
| SU | 631464 A1 | 11/1978 |
| SU | 556593 A1 | 8/1982 |
| SU | 548188 A1 | 9/1982 |
| SU | 1098916 A1 | 6/1984 |
| SU | 1150234 A1 | 4/1985 |
| SU | 1655920 A1 | 6/1991 |
| TW | 201111317 A | 4/2011 |
| TW | 201119967 A | 6/2011 |
| TW | 1393686 B | 4/2013 |
| TW | 201343590 A | 11/2013 |
| TW | 201343591 A | 11/2013 |
| TW | 201418174 A | 5/2014 |
| TW | 201509858 A | 3/2015 |
| TW | 201609589 A | 3/2016 |
| TW | 201623168 A | 7/2016 |
| WO | 90/03337 A1 | 4/1990 |
| WO | 99/44952 A1 | 9/1999 |
| WO | 01/16040 A1 | 3/2001 |
| WO | 01/34531 A1 | 5/2001 |
| WO | 02/16277 A1 | 2/2002 |
| WO | 03/14035 A1 | 2/2003 |
| WO | 2006/083902 A1 | 8/2006 |
| WO | 2006/110145 A1 | 10/2006 |
| WO | 2008/020509 A1 | 2/2008 |
| WO | 2008/143999 A1 | 11/2008 |
| WO | 2008/147558 A1 | 12/2008 |
| WO | 2010/076903 A1 | 7/2010 |
| WO | 2011/122678 A1 | 10/2011 |
| WO | 2012/082709 A1 | 6/2012 |
| WO | 2012/125857 A1 | 9/2012 |
| WO | 2012/142629 A1 | 10/2012 |
| WO | 2013/001841 A1 | 1/2013 |
| WO | 2013/016157 A1 | 1/2013 |
| WO | 2013/078039 A1 | 5/2013 |
| WO | 2013/130665 A2 | 9/2013 |
| WO | 2013/130700 A1 | 9/2013 |
| WO | 2014/024583 A1 | 2/2014 |
| WO | 2014/030682 A1 | 2/2014 |
| WO | 2014/060108 A2 | 4/2014 |
| WO | 2014/139147 A1 | 9/2014 |
| WO | 2014/182641 A1 | 11/2014 |
| WO | 2014/182776 A1 | 11/2014 |
| WO | 2014/201315 A1 | 12/2014 |
| WO | 2015/031148 A1 | 3/2015 |
| WO | 2015/031594 A2 | 3/2015 |
| WO | 2015/033562 A1 | 3/2015 |
| WO | 2015/057552 A2 | 4/2015 |
| WO | 2015/088010 A1 | 6/2015 |
| WO | 2015/125584 A1 | 8/2015 |
| WO | 2015/156262 A1 | 10/2015 |
| WO | 2016/019171 A1 | 2/2016 |
| WO | 2016/037793 A1 | 3/2016 |
| WO | 2016/057590 A1 | 4/2016 |
| WO | 2016/094262 A1 | 6/2016 |
| WO | 2016/183059 A1 | 11/2016 |
| WO | 2017/019837 A1 | 2/2017 |
| WO | 2017/020041 A1 | 2/2017 |
| WO | 2017/066243 A1 | 4/2017 |
| WO | 2017/071911 A1 | 5/2017 |
| WO | 2017/079540 A1 | 5/2017 |
| WO | 2017/139552 A1 | 8/2017 |
| WO | 2018/136384 A1 | 7/2018 |
| WO | 2018/136388 A1 | 7/2018 |
| WO | 2021/025981 A1 | 2/2021 |

OTHER PUBLICATIONS

Danishkin, G. K. et al., "Development of a Continuous Method of Bending and Toughening Glass," Glass and Ceramics, vol. 34, Issue 8, Aug. 1977, pp. 495-498.

Daudeville, L. et al., "Numerical Simulation of Soda-Lime Silicate Glass Tempering," Journal de Physique IV, France, vol. 6, No. C1, Jan. 1996, pp. C1-175-C1-185.

Daudeville, Laurent et al., "Thermal Tempering Simulation of Glass Plates: Inner and Edge Residual Stresses," Journal of Thermal Stresses, vol. 21, 1998, pp. 667-689.

De Grauw, C. J. et al., "Axial resolution of confocal Raman microscopes: Gaussian beam theory and practice," Journal of Microscopy, vol. 188, PI. 3, Dec. 1997, pp. 273-279.

Deschamps, T. et al., "Soda-lime silicate glass under hydrostatic pressure and indentation: a micro-Raman study," Abstract, 2011, 1 page.

Donald, I. W., "Review: Methods for improving the mechanical properties of oxide glasses," Journal of Materials Science, vol. 24, 1989, pp. 4177-4208.

Dr.Tallant, T.A. Michalske, and W.L. Smith, "The effects of tensile stress on the Raman spectrum of silica glass," J. Non-Cryst. Solids, 106 380-383 (1988).

Electronic Cooling Editors, "The Thermal Conductivity of Gases", Design, Materials, Adhesives, Substrates, No. 3, Technical Data, Test & Measurement, vol. 4, Gases, Thermal Conductivity, Sep. 1, 1998, 2 pages.

English Translation of CN104211288A, Performed by Phoenix Translations Jun. 2016.

Ernsberger, F. M., "Chapter 1: Elastic Properties of Glasses," In "Glass: Science and Technology," vol. 5, Elasticity and Strength in Glasses, Academic Press, Inc., May 28, 1980, pp. 1-19.

Ernsberger, F. M., "Chapter 4: Techniques of Strengthening Glasses," In "Glass: Science and Technology," vol. 5, Elasticity and Strength in Glasses, Academic Press, Inc., May 28, 1980, pp. 133-144.

Europtec; "Themal Tempering" ; Europtec GMBH, DIC, Jun. 11, 2014; www.europtec.de.

Everall, Neil et al., "Optimizing Depth Resolution in Confocal Raman Microscopy: A Comparison of Metallurgical, Dry Corrected, and Oil Immersion Objectives," Applied Sprectroscopy, vol. 61, No. 3, 2007, pp. 251-259.

Everall, Neil J., "Confocal Raman Microscopy: Why the Depth Resolution and Spatial Accuracy Can Be Much Worse then You Think," Applied Spectroscopy, vol. 54, No. 10, 2000, pp. 1515-1520.

Fajans, Kasimir et al., "Properties and Structures of Vitreous and Crystalline Boron Oxide," Journal of the American Chemical Society, vol. 74, No. 11, Jun. 5, 1952, pp. 2761-2768.

(56) References Cited

OTHER PUBLICATIONS

Fotheringham, Dr. Ulrich, "Lecture 1: Internet teaching set-up," IMI-NFG's MITT Course on Relaxation Processes in Glass and Polymers Lecture 1, 2010, 6 slides.
Fotheringham, Dr. Ulrich, "Lecture 2: Phenomenology of viscoelasticity & glass transition," IMI-NFG's MITT Course on Relaxation Processes in Glass and Polymers Lecture 2, 2010, 17 slides.
Fotheringham, Dr. Ulrich, "Lecture 5: Viscoelasticity I—Shear," IMI-NFG's MITI Course on Relaxation Processes in Glass and Polymers Lecture 5, 2010, 19 slides.
Fotheringham, Dr. Ulrich, "Lecture 6: Viscoelasticity II—Bulk Viscoelasticity," IMI-NFG's MITI Course on Relaxation Processes in Glass and Polymers Lecture 6, 2010, 16 slides.
Fotheringham, Dr. Ulrich, "Lecture 7: Viscoelasticity III—Dynamic Testing," IMI-NFG's MITT Course on Relaxation Processes in Glass and Polymers Lecture 7, 2010, 19 slides.
Fotheringham, Dr. Ulrich, "Lecture 8: Viscoelasticity IV—Important Application of Pre-Stressing," IMI-NFG's MITT Course on Relaxation Processes in Glass and Polymers Lecture 8, 2010, 12 slides.
Freiman, S. W., "Chapter 2: Fracture Mechanics of Glass," In "Glass: Science and Technology," vol. 5, Elasticity and Strength in Glasses, Academic Press, Inc., May 28, 1980, pp. 21-78.
Frick, B. et al., "The Microscopic Basis of the Glass Transition in Polymers from Neutron Scattering Studies," Science, vol. 267, Mar. 31, 1995, pp. 1939-1945.
Galeener, Frank L., "Raman and ESR Studies of the Thermal History of Amorphous $SiO_2$," Journal of Non-Crystalline Solids, vol. 71, 1985, pp. 373-386.
Gammelgaard et al., "Graphene transport properties upon exposure to PMMA processing and heat treatments", 2D Materials, vol. 1, 2014, 035005, 12 pages.
Gang, Zhang Ming, "Manufacturing and Properties of Glass Used in Construction," Guangdong Golden Glass Technologies Ltd, Dec. 27, 2002, 11 pages.
Gao, "Glass weathering and methods for preventing it," Wuhan University of Technology Press, Dec. 31, 1995, 5 pags (Translation Attached.
Gardon, Robert, "Calculation of Temperature Distributions in Glass Plates Undergoing Heat-Treatment," Journal of the American Ceramic Society, vol. 41, No. 6, Jun. 1958, pp. 200-209.
Gardon, Robert, "Chapter 5: Thermal Tempering of Glass," In "Glass: Science and Technology," vol. 5, Elasticity and Strength in Glasses, Academic Press, Inc., May 28, 1980, pp. 145-216.
Gardon, Robert, "Tempering Glass with Modulated Cooling Schedules," Journal of the American Ceramic Society, vol. 71, No. 10, Oct. 1988, pp. 876-878.
Gardon, Robert, "Variation of Densities and Refractive Indices in Tempered Glass," Journal of the American Ceramic Society, vol. 61, No. 3-4, Mar.-Apr. 1978, pp. 143-146.
Gardon; "Thermal Tempering of Glass"; pp. 146-216 In Glass: Science and Technology, vol. 5, Elasticity and Strentth in Glasses, Ed. by D.R. Uhlmann and N.J. Kreidl, Academic Press, New York, 1980.
Glass Unlimited "AGC Technical Data Sheet Planibel". ; Nov. 2011 (Year: 2011).
Glass, Jill et al., "Processing and Properties of Ion Exchanged Glasses," Glass and Optical Materials Division Fall Meeting, Nov. 6-12, 2004, Cape Canaveral, FL, 33 slides.
Glass, S. J. et al., "Stressed Glass Technology for Actuators and Removable Barrier Applications," Sandia Report SAND2007-4106, Sandia National Laboratories, Jul. 2007, 18 pages.
Global Dossier Translation of JP 2018-504918 Office Action Dated Jul. 15, 2020; 2 Pages; Japanese Patent Office.
Gomez, Sinue et al., "69.2: Designing Strong Glass for Mobile Devices," SID Symposium Digest of Technical Papers, vol. 40, No. 1, Jan. 2009, pp. 1045-1048.
Gross et al. "A glass with high crack initiation load: Role of fictive temperature-independent mechanical properties"; Journal of Non-crystalline Solids 355 (2009) pp. 563-568 (Year: 2009).
Gross, T.M., "Deformation and cracking behavior of glasses indented with diamond tips of various sharpness," Journal of Non-Crystalline Solids, vol. 358, Issue 24, Dec. 12, 2012, pp. 3445-3452.
Guillemet, C., "Annealing and Tempering of Glass," Journal of Non-Crystalline Solids, vol. 123, 1990, pp. 415-426.
Gulati, "Frangibility of Tempered Soda-Lime Glass Sheet," pp. 13-15 in Glass Performance Days, 1997.
Guo, Xiaoju et al. "Unified approach for determining the enthalpic fictive temperature of glasses with arbitrary thermal history" Journal of Non-Crystalline Solids, vol. 357, 2011, pp. 3230-3236.
Gupta, Prabhat K. et al., "The laboratory glass transition," The Journal of Chemical Physics, vol. 126, 2007, 9 pages.
Gupta, Prabhat, "Landscape Approach to Glass Transition and Relaxation: Basic Concepts (contd.)," IMI-NFG's MITT Course on Relaxation Processes in Glass Lecture 18, Mar. 25, 2010, 23 slides.
Gupta, Prabhat, "Landscape Approach to Glass Transition and Relaxation: Four lectures on 'The Landscape Approach,'" IMI-NFG's MITT Course on Relaxation Processes in Glass Lecture 17, Mar. 23, 2010, 28 slides.
Gupta, Prabhat, "Landscape Approach to Glass Transition and Relaxation: Liquid to Glass Transition," IMI-NFG's MITT Course on Relaxation Processes in Glass Lecture 19, Mar. 30, 2010, 25 slides.
Gupta, Prabhat, "Landscape Approach to Glass Transition and Relaxation: Relaxation in the glassy state," IMI- NFG's Min Course on Relaxation Processes in Glass Lecture 20, Apr. 1, 2010, 20 slides.
Gy, Rene, "Ion exchange for glass strengthening," Materials Science and Engineering B, vol. 149, 2008, pp. 159-165.
Hara, Morihisa et al., "Vickers Hardness of Toughened Sheet Glass," Reports of the Research Laboratory, Asahi Glass Co., LtdF., vol. 12, No. 2, 1962, pp. 99-104.
Hibino, Yoshinori et al., "Raman study on silica optical fibers subjected to high tensile stress," Applied Physics Letters, vol. 47, No. 8, Oct. 15, 1985, pp. 812-814.
Hodge, Ian M., "Physical Aging in Polymer Glasses," Science, vol. 267, No. 5206, Mar. 31, 1995, pp. 1945-1947.
Hrma et al; "Thermal Healing of Cracks in Glass"; Journal of Non-Crystalline Solids; vol. 102, (1988); pp. 88-94.
Huang, Liping et al., "Polyamorphic transitions in vitreous $B_2O_3$ under pressure," Journal of Physics: Condensed Matter, vol. 20, 2008, 8 pages.
Hubert, Mathieu, "Lecture 9: Annealing and tempering," IMI-NFG Course on Processing in Glass—Lecture 9, Feb. 19, 2015, 72 slides.
Hutchins, J. and R. Harrington, "Glass", Kirk-Othmer Encyclopedia of Chemical Technology, 2nd Edition, vol. 10, 1966, pp. 533-604.
Ito, Setsuro, "Brittleness and Nano-Structure of Glass," 4th International Workshop on Flow and Fracture of Advanced Glasses Presentation, Nov. 5-7, 2007, Shiga, Japan, 37 slides.
Jain, Himanshu, "Electrical Relaxation—Topic 1: Quasi-free ion transport," IMI-NFG's MITI Course on Relaxation Processes in Glass Lecture 23, Advanced Vitreous State, The Properties of Glass: Dielectric Properties—Lecture 1, 2010, 28 slides.
Jain, Himanshu, "Electrical Relaxation—Topic 3: Nearly constant loss—second universality," IMI-NFG's Min Course on Relaxation Processes in Glass Lecture 25, Advanced Vitreous State, The Properties of Glass: Dielectric Properties—Lecture 3, 2010, 24 slides.
John Klein et al: "Additive Manufacturing of optically Transparent Glass", 3D Printing and Additive Manufactureing, vol. 2, No. 3, Aug. 19, 2015 (Aug. 19, 2015), pp. 92-105, XP055328426.
Karlsson, Stefan et al., "The technology of chemical glass strengthening—a review," Glass Technology, European Journal of Glass Science Technology Part A, vol. 51, No. 2, Apr. 2010, pp. 41-54.
Kassir-Bodon, Assia et al., "Raman Mapping of the Indentation-Induced Densification of a Soda-Lime-Silicate Glass," International Journal of Applied Glass Science, vol. 3, No. 1, 2012, pp. 29-35.
Kiefer, Werner et al., "Method for Thermal Prestressing of Glass," Strength of Inorganic Glass, Plenum Press, New York, 1985, pp. 501-511.
Kishii, Toru, "Surface Stress Meters Utilising the Optical Waveguide Effect of Chemically Tempered Glasses," Optics and Lasers in Engineering, vol. 4, 1983, pp. 25-38.

(56) References Cited

OTHER PUBLICATIONS

Kistler, S. S., "Stresses in Glass Produced by Nonuniform Exchange of Monovalent Ions," Journal of the American Ceramic Society, vol. 45, No. 2, Feb. 1962, pp. 59-68.
Koike et al.—Sub-critical crack growth rate of soda-lime-silicate glass and less brittle glass as a function of fictive temperature; Journal of Non-Crystalline Solids vol. 353 Issue 27 pp. 2675-2680; Jun. 2007 (Year: 2007).
Koike, A. et al., "Fictive temperature dependence of subcritical crack growth rate of normal glass and anomalous glass," Journal of Non-Crystalline Solids, vol. 352, 2006, pp. 5522-5530.
Kong, Jinhak et al., "Residual Stress Analysis with Improved Numerical Methods for Tempered Plate Glasses Based on Structural Relaxation Model," Metals and Materials International, vol. 13, No. 1, 2007, pp. 67-75.
Lathabai, Srinivasarao et al., "Fracture mechanics model for sub-threshold indentation flaws: Part 1—Equilibrium fracture," Journal of Materials Science, vol. 26, 1991, pp. 2157-2168.
Lee, Hoikwan et al., "Glass Thickness and Fragmentation Behavior in Stressed Glasses," New Journal of Glass and Ceramics, vol. 2, 2012, pp. 138-143.
Lezzi, P. J. et al., "Confirmation of thin surface residual compressive stress in silica glass fiber by FTIR reflection spectroscopy," Journal of Non-Crystalline Solids, vol. 390, 2014, pp. 13-18.
Li, Hong et al., "Effect of Fictive Temperature on Dynamic Fatigue Behavior of Silica and Soda-Lime Glasses," Journal of the American Ceramic Society, vol. 78, No. 5, 1995, pp. 1393-1396.
Lin et al., "Graphene annealing: how clean can it be?", Nano Lett., vol. 12, Issue 1, 2012, pp. 414-419.
Loucks, "Lecture 13: The Fictive and Glass Transition Temperatures," IMI-NFG's Min Course on Relaxation Processes in Glass Lecture 13, Mar. 2, 2010, 25 Slides.
Loucks, "Lecture 14: Relaxation and the Tool-Narayanaswamy-Moynihan Equation," IMI-NFG's MITT Course on Relaxation Processes in Glass Lecture 14, Mar. 4, 2010, 27 Slides.
Loucks, "Lecture 15: The Tool-Narayanaswamy-Moynihan Equation Part II and DSC," IMI-NFG's MITT Course on Relaxation Processes in Glass Lecture 15, Mar. 9, 2010, 33 Slides.
Luo et al., "Competing Indentation Deformation Mechanisms in Glass Using Different Strengthening Methods", Frontiers in Materials, vol. 3, No. 52, 2016, 11 pages.
Luo et al; "Additive Manufacturing of Glass for Optical Applications"; Proc. of SPIE, vol. 9738, 2016; pp. 97380Y-1-97380Y-9.
Markovsky, Alex et al., "An Efficient and Stable Algorithm for Calculating Fictive Temperatures," Communications of the American Ceramic Society, Apr. 1984, 2 pages.
Martin, Dr. Steve, "Lecture 10: Thermodynamic Functions," IMI-NFG's MITT Course on Relaxation Processes in Glass Lecture 10, 2010, 25 slides.
Martin, Dr. Steve, "Lecture 11: Thermodynamics in the Glass Transition Region," IMI-NFG's MITT Course on Relaxation Processes in Glass Lecture 11, 2010, 22 slides.
Martin, Dr. Steve, "Lecture 12: The Glass Transition as a Kinetic Transition," IMI-NFG's Min Course on Relaxation Processes in Glass Lecture 12, 2010, 21 slides.
Martin, Dr. Steve, "Lecture 9: Thermodynamic Concepts and the Law of Thermodynamics," IMI-NFG's Min Course on Relaxation Processes in Glass Lecture 9, 2010, 32 slides.
Massen, Claire P. et al., "Power-law distributions for the areas of the basins of attraction on a potential energy landscape," Physical Review E, The American Physical Society, vol. 75, 2007, 4 pages.
Mauricio-Iglesias, M. et al., "Raman depth-profiling characterization of a migrant diffusion in a polymer," Journal of Membrane Science, vol. 375, 2011, pp. 165-171.
McGlinchy, Timothy B., "Energy Efficient Tripe IG Automation EEE (Triple-E)," DE-EE0000167, GED Integrated Solutions, Feb. 28, 2013, 45 pages.
McMaster, Ronald A. et al., "Annealed and Tempered Glass," Engineered Materials Handbook, vol. 4, Ceramics and Glasses, 1991, 9 pages.

Mcmaster, Ronald A., "Flat Glass Tempering—How II Works," Glass Industry, Jun. 1989, pp. 10-15.
McMaster, Ronald A., "Fundamentals of Tempered Glass," Proceedings of the 49th Conference on Glass Problems: Ceramic Engineering and Science Proceedings, vol. 10, Issue 3/4, 1989, pp. 193-206.
Merriam-Webster Online Dictionary, "Coextensive" , 2009, 1 page. Retrieved from: https://www.merriam-webster.com/dictionary/coextensive.
Mikowski, A. et al., "Statistical analysis of threshold load for radial crack nucleation by Vickers indentation in commercial soda-lime silica glass," Journal of Non-Crystalline Solids, vol. 352, 2006, pp. 3544-3549.
Mognato, Ennio et al., "Thermally toughened safety glass," Glass on Web, Last Reviewed: Jul. 2011, 9 pages, http://www.glassonweb.com/articles/article/727/.
Morey; "The Effect of Boric Oxide on the Devitrification of the Soda-Lime-Silica Glasses. The Quaternary System, Na2O—CaO—B2O3—SiO2"; Journal of the Amercian Ceramic Society; vol. 15, Issue 9; pp. 457-475 (1932).
Moynihan, C. T. et al., "Structural Relaxation in Vitreous Materials," Annals of the New York Academic of Sciences, vol. 279, Oct. 1976, pp. 15-35.
Narayanaswamy, 0. S. et al., "Calculation of Residual Stresses in Glass," Journal of the American Ceramic Society, vol. 52, No. 10, Oct. 1969, pp. 554-558.
Narayanaswamy; "Stress and Structural Relaxation in Tempering Glass," J. Am. Ceram. Soc., 61[3-4] 146-152 (1978).
Oakley, David R., "Crack branching in float glass subjected to biaxial loading," Journal of Non-Crystalline Solids, vol. 196, 1996, pp. 139-143.
Ohlberg, S.M. et al., "Thermal Stress Calculations Based on a Linear Viscoelastic Deviatoric Response and a Fictive Temperature Component for the Volumetric Response," Journal of Non-Crystalline Solids, vol. 14, 1974, pp. 280-286.
Paschel, Richard, "History of the Safety Glazing Certification Council," Safety Glazing Certification Council, 1971, 11 pages.
Properties of Soda-Lime Silica Float Glass Technical Bulletin; NSG; Group; Pilkington North America , Inc. Jan. 14, 2013 (Year: 2013).
Ray, N. H. et al., "Increasing the strength of glass by treatment in molten salts," Physics and Chemistry of Glasses, vol. 8, No. 1, Feb. 1967, pp. 30-34.
Rekhson, S. M., "Chapter 1: Viscoelasticity of Glass," In "Glass: Science and Technology," vol. 3, 1986, 117 pages.
Rekson, S. M., "Structural Relaxation and Shear Stresses in the Glass-Transition Region," Soviet Journal of Glass Physics and Chemistry, 1975, pp. 417-421.
Sastry, Srikanth, "The relationship between fragility, configurational entropy and the potential energy landscape of glass-forming liquids," Nature, vol. 409, Jan. 11, 2001, pp. 164-167.
Scherer, George W., "Use of the Adam-Gibbs Equation in the Analysis of Structural Relaxation," Journal of the American Ceramic Society, vol. 67, No. 7, Jul. 1984, pp. 504-511.
Sciortino, Francesco, "Potential energy landscape description of supercooled liquids and glasses, " Journal of Statistical Mechanics: Theory and Experiment, May 31, 2005, 35 pages.
Sehgal, Jeetendra et al., "A New Low-Brittleness Glass in the Soda-Lime-Silica Glass Family," Journal of the American Ceramic Society, vol. 81, No. 9, Sep. 1998, pp. 2485-2488.
Setsuro, Ito et al., "Processing Technical Books to the Glass High-Functions," Chapter 3: Sections 2.5, 3, 3.1, 3.2 & 3.3, Science & Technology Co., Ltd., Sep. 27, 2012, pp. 58-65.
Sglavo, V., A. Prezzi, M. Alessandrini, "Processing of Glasses with Engineered Stress Profiles," Journal of Non- Crystalline Solids, 344 (2004), 73-78.
Shelby "Introduction to Glass Science and Technology"; The Royal Chemical Society, 2nd Edition, 2005; p. 193.
Shimodaira, N. et al., "Raman spectra of fluorine-doped silica glasses with various fictive temperatures," Journal of Applied Physics, vol. 91, No. 6, Mar. 15, 2002, pp. 3522-3525.

(56) References Cited

OTHER PUBLICATIONS

Shinkai, Norihiko et al., "Indentation Fracture of Tempered Glasses," Reports of the Research Laboratory, Asahi Glass Co., Ltd., vol. 23, No. 2, 1973, pp. 83-99.
Shouyuan, Zhai et al., "Influence of Temperature and Time on Glass Strength During Chemical Tempering," Journal of Shangdong Institute of Light Industry (Natural Science Edition), Feb. 1996, 3 pages.
Shutov, A. I. et al., "Prediction of the Character of Tempered Glass Fracture," Glass and Ceramics, vol. 55, Nos. 1-2, 1998, pp. 8-10.
Soules, Thomas F. et al., "Finite-Element Calculation of Stresses in Glass Parts Undergoing Viscous Relaxation," Journal of the American Ceramic Society, vol. 70, No. 2, Feb. 1987, pp. 90-95.
Southard, J. C., "The Thermal Properties of Crystalline and Glassy Boron Trioxide," Journal of the American Chemical Society, vol. 63, No. 11, Nov. 1941, pp. 3147-3150.
Spaght, Monroe E. et al., "Studies on Glass. VIII. The Coefficient of Thermal Expansionof Boron Trioxide," Journal of Physical Chemistry, vol. 38, No. 1, 1934, pp. 103-110.
Specialty Glass Products, "Soda Lime/AR/Flint Glass"; http://www.sgpinc.com/sodalime.htm accessed Aug. 11, 2016.
Stillinger, Frank H. et al., "Packing Structures and Transitions in Liquids and Solids," Science, New Series, vol. 225, No. 4666, Sep. 7, 1984, pp. 983-989.
Stillinger, Frank H., "A Topographic View of Supercooled Liquids and Glass Formation," Science, New Series, vol. 267, No. 5206, Mar. 31, 1995, pp. 1935-1939.
Tallant, D. R. et al., "The Effects of Tensile Stress on the Raman Spectrum of the Silica Glass," Journal of Non-Crystalline Solids, vol. 106, 1988, pp. 380-383.
Tandon, Rajan et al., "Controlling the Fragmentation Behavior of Stressed Glass," Fracture Mechanics of Ceramics, vol. 14, 2005, pp. 77.
Timoshenko et al; "Theory of Elasticity"; 2nd Ed; p. 146. McGraw-Hill Book Co., New York, 1951.
To, Q.D., et al., "Failure analysis of tempered glass structures with pin-loaded joints," Engineering Failure Analysis, vol. 14, Issue 5, Jul. 2007, pp. 841-850.
Tomlinson, R., G. Calvert, and A. Conway, "A Photoelastic Investigation Into Spontaneous Glass Fracture", Proceedings of the XIth International Congress and Exposition, (Jun. 2008) 8 pgs.
Varughese, Binoy et al., "Effect of fictive temperature on mechanical strength of soda-lime glasses," Journal of Non-Crystalline Solids, vol. 241, 1998, pp. 134-139.
Walrafen, G. E. et al., "Raman investigation of optical Abers under high tensile stress," Journal of Applied Physics, vol. 52, No. 4, Apr. 1981, pp. 2832-2836.
Wang et al; "Glass and Hot Extrusion by Me Module for 3D Additive Manufacturing"; IEEE, 2016; pp. 1167-1171.
Wang, Fei et al., "Pressure Raman effects and internal stress in network glasses," Physical Review B, vol. 71, 2005, 32 pages.
Weissmann, Rand D. Durkop, "A Novel Method for Measuring Stresses in Flat Glass", XV International Congress on Glass Leningrad 1989, Proceeding 3b, O. V. Mazurin, ed., pp. 217-220.
WO-2016037793-A1—Bib Dta (Year: 2016).
Yamane, Masayuki, "Chapter 3: Thermal Processing," Glass Engineering Handbook, Asakura Publishing Co. Ltd., Jul. 1999, pp. 410-417.
Young Modulus of the elements; Wolfram Research Inc.; http://periodictable.com/Properties/A/YoungModulus.v.html; printed Mar. 7, 2019 (Year: 2019).
Yue, Y.Z. et al., "Determination of the Active temperature for a hyperquenched glass," Chemical Physics Letters, vol. 357, Issues 1-2, May 3, 2002, pp. 20-24.
Zaccaria et al; "Thermal Healing of Realistic Flaws in Glass"; J. Mater. Civ. Eng 2016, 28(2); pp. 04015127-1-04015127-9.
Zaman, F. D. et al., "Cooling of a Plate with General Boundary Conditions," International Journal of Mathematics and Mathematical Sciences, vol. 23, No. 7, 2000, pp. 477-485.
Zhi-hai, L., "Development status and trend of tempered glass," Glass, Apr. 30, 2004, pp. 49-52 (Orignal Document Only ).
"Effects of ion exchange on the Young's modulus of glass"; John D. Mackenzie, J. Wakaki; Journal of Non-crystalline Solids; vols. 38-39, Part 1 May-Jun. 1980, pp. 385-390 (Year: 1980).
"Energy Curable Resins", https://www.allnex.com/en/technologies/energy-curable-resins; retrieved on Oct. 10, 2022.
Aben, H. et al., "2.7 Stresses Due to Heterogeneities," Photoelasticity of Glass, Springer-Verlag, New York, 1993, 260 pages.
Acloque, P., "Influence of Strain-Systems in Glass upon the Course of its Fracture," Proceedings of the 4th International Glass Congress, vol. 6, 1965, pp. 279-291.
Acloque, Paul, "Comparison Between Heat-Transfer Conditions and Setting Up of Strain in Glass During Heat-Treatment," Journal of the American Ceramic Society, vol. 44, No. 7, Jul. 1961, pp. 364-373.
Agarwal, Anand et al., "A simple IR spectroscopic method for determining fictive temperature of silica glasses," Journal of Non-Crystalline Solids, vol. 185, 1995, pp. 191-198.
Agarwal, Anand et al., "Determination of Fictive Temperature of Soda-Lime Silicate Glass," Journal of the American Ceramic Society, vol. 78, No. 3, Mar. 1995, pp. 827-829.
Akeyoshi, K. et al., "Mechanical Properties of Tempered Glass," Proceedings of the 7th International Glass Congress, vol. 14, 1965, pp. 80-85.
Alexiades, V. et al., "The New Way/Glaston Problem," 28th Annual Workshop on Mathematical Problems in Industry, University of Delaware, Jun. 2012, 30 slides.
Argon, A. S., "Chapter 3: Inelastic Deformation and Fracture in Oxide, Metallic, and Polymeric Glasses," In, "Glass: Science and Technology," vol. 5, Elasticity and Strength in Glass, Academic Press, May 28, 1980, pp. 79-132.
Aronen, Antti et al., "Tempering of Thin Glass," Glasstec 2012: Engineered Transparency, Oct. 25-26, 2012, pp. 145-153.
ASTM C1499-09, "Standard Test Method for Monotonic Equibiaxial Flexural Strength of Advanced Ceramics at Ambient Temperature", 2013, 14 pages.
ASTM C158-02, "Standard Test Methods for Strength of Glass by Flexure" (Determination of Modulus of Rupture), 2012, 9 pages.
Author Unknown, "Application Note AN 527: Depth profiling of complex samples using confocal Raman microscopy," Bruker Optics Inc., 2012, 3 pages.
Author Unknown, "Architectural ERH2 ," Architectural Glass Systems, Glasstech, Inc., 2011, 2 pages.
Author Unknown, "Architectural FCH2(Trademark) ," Architectural Glass Systems, Glasstech, Inc., 2011, 2 pages.
Author Unknown, "Coming(Registered) Gorilla(Trademark) Glass," Corning Incorporated, 2009, 2 pages.
Author Unknown, "Glass Strengthening Methods," Abrisa Technologies, Apr. 2015, 2 pages.
Author Unknown, "Heat Treated Glass for Architectural Glazing," Glass Technical Document: TD-138, PPG Glass Technology, PPG Industries, Inc., Nov. 2011, 8 pages.
Author Unknown, "Introducing—Glasstech CRB-S.TM. 1900 for Solar Parabolic Shapes," Solar Glass Systems, Glasstech, Inc., Date Unknown, 1 page, Retrieved Jul. 1, 2015.
Author Unknown, "New Way Air Bearings," 28th Annual Workshop on Mathematical Problems in Industry, University of Delaware, Jun. 2012, 16 slides.
Author Unknown, "Products, Glazing Techniques and Maintenance Section 4: GGF Dalasheet for the Quality of Thermally Toughened Soda Lime Silicate Safety Glass for Building," Glass and Glazing Federation, Aug. 2009, 12 pages.
Author Unknown, "Schott Technical Glasses—Physical and technical properties," Schott North America, Inc., Feb. 2010, 44 pages.
Author Unknown, "scratch and dig numbers," Sizes, Inc., Last Revised: Jun. 24, 2010, 5 pages, http:/fwww.sizes.com/units/scratch_and_dig.him.
Author Unknown, "Solar FCH-S(Trademark) ," Solar Glass Systems, Glasstech, Inc., 2011, 2 pages.
Author Unknown, "Standard Specification for Heat-Strengthened and Fully Tempered Flat Glass," Designation: C 1048-12, ASTM International Standard, 2015, 7 pages.

(56) References Cited

OTHER PUBLICATIONS

Author Unknown, "Standard Specification for Heat-Treated Flat Glass—Kind HS, Kind FT Coated and Uncoated Glass," Designation: C 1048-4, ASTM International Standard, 2009, 7 pages.
Author Unknown, "Subject Index," Date Unknown, pp. 277-282. Retrieved Apr. 24, 2015.
Author Unknown, "Tempered Glass," Tecnoglass, www.tecnoglass.com/tempered.pdf, Date Unknown, 5 pages, Retrieved Jul. 28, 2015.
Author Unknown, "Thermal Tempering," EuropTec GmbH, Nov. 6, 2014, 2 pages.
Author Unknown, "Unsteady Heat Transfer—HT3: Experimental Studies of Thermal Diffusivities and Heat Transfer Coefficients," Date Unknown, 27 slides, Retrieved Jul. 21, 2015.
Ayinder, C.C. et al., "Thermal-Tempering Analysis of Bulk Metallic Glass Plates Using an Instant-Freezing Model," Metallurgical and Materials Transactions A, vol. 32A, Nov. 2001, pp. 2709-2715.
Baldwin, K. J. et al., "Confocal Raman Microspectroscopy through a Planar Interface," Applied Spectroscopy, vol. 55, No. 5, 2001, pp. 517-524.
Bandyopadhyay et al; "Application of Fused Deposition in Controlled Microstructure Metal-Ceramic Composites", Rapid Prototyping Journal, vol. 12 Issue 3, pp. 121 128 (2006).
Barr, J. W., "Glass Tempering by Numbers," Aug. 2008, 8 pages.
Barr, Jonathan W., "The Tempering Process," Cardinal Waxachachie Tempering Seminar, Mar. 26, 2008, 36 slides.
Barr, Jonathan, "The Glass Tempering Handbook—Understanding the Glass Tempering Process," Self Published, 2015, 52 pages, http://www.lambertgtservices.co.uk/book/TheGlassTemperingHandbook.pdf.
Barsom, John M., "Fracture of Tempered Glass," Journal of the American Ceramic Society, vol. 51, No. 2, Feb. 1968, pp. 75-78.
Bartholomew, Roger F. et al., "Chapter 6: Chemical Strengthening of Glass," In "Glass: Science and Technology," vol. 5, Elasticity and Strength in Glass, Academic Press, May 28, 1980, pp. 217-270.
Beauchamp, Edwin K. et al., "Dynamics of Window Glass Fracture in Explosions," Sandia Report SAND98-0598 UC-700, Sandia National Laboratories, May 1998, 74 pages.
Bird, R. D., W. E. Stewart, and E. N. Lightfoot, Transport Phenomena—Chapter 11: The Equations of Change for Nonisothermal Systems, Wiley, (1960) pp. 349-373.
Bird, R. D., W. E. Stewart, and E. N. Lightfoot, Transport Phenomena—Chapter 3: The Equations of Change for Isothermal Systems, Wiley, (1960) pp. 75-113.
Boaz, Prem, "Tempering Very Thin Glass-What Radio Waves Mean for the Glass Industry," USGlass Magazine, vol. 45, Issue 3, Mar. 2010, 5 pages.
Boaz, Prem, "Thin glass processing with radio wave assist," Glass on Web, Last Reviewed: Jan. 2013, 6 pages, http://www.glassonweb.com/articles/article/561/.
Boguslavskll, I. A., "Studying the Nature of the Super-Strength of Glasses Strengthened by the Thermophysical Method," Glass and Ceramics, vol. 21, No. 10, Oct. 1964, pp. 562-567.
Brown, Angus M., "Nonlinear regression analysis of data using a spreadsheet," Application Note, ISC, Oct. 2001, pp. 58-59.
Chen, et al., "Nanopatterned Graphene on a Polymer Substrate by a Direct Peel-off Technique", ACS Appl. Mater. Interfaces, vol. 7, Issue 10, 2015, pp. 5938-5943.
Choi et al., "Influence of removing PMMA residues on surface of CVD graphene using a contact-mode atomic force Microscope" RSC Adv., vol. 7, 2017, pp. 6943-6949.
CN101671112A English Translation Performed by USPTO Translations Service Center Apr. 2017.
Conradt, Reinhard, "I. Fragility and its Relation to Other Glass Properties," IMI-NFG's MITT Course on Relaxation Processes in Glass Lecture 21, Apr. 6-8, 2010, 61 slides.

\* cited by examiner

NON-IOX GLASSES WITH HIGH COEFFICIENT OF THERMAL EXPANSION AND PREFERENTIAL FRACTURE BEHAVIOR FOR THERMAL TEMPERING

This application is a continuation of U.S. application Ser. No. 16/767,191 filed May 27, 2020, which claims the benefit of priority under 35 U.S.C. § 371 of International Application No. PCT/US18/063404, filed on Nov. 30, 2018, which claims the benefit of priority under 35 U.S.C. § 120 of U.S. Application Ser. No. 62/592,683 filed on Nov. 30, 2017, the content of which is relied upon and incorporated herein by reference in its entirety.

FIELD OF DISCLOSURE

The disclosure relates to fusion formable glasses with high coefficients of thermal expansion and low fracture toughness designed for thermal tempering. The s e glasses are ideally suited to produce a "dicing" pattern when thermally tempered, even at very thin thicknesses. They have high thermal expansions at low and high temperatures to produce increased temper stresses once quenched, coupled with low fracture toughness which promotes crack bifurcation and enhanced frangibility.

BACKGROUND

Thermally-tempered glass, sometimes called safety glass, is often applied in situations where safe fracture behavior is required to prevent injury in the case of failure. For example, safety glass is used to strengthen automobile side and rear windows, as well as objects such as shower doors. The property of tempered glass that makes it so desirable in safety applications is that when it breaks, it shatters into rock salt-like, cubicle pieces which do not have sharp edges or needle-like points. This desired fracture behavior is called "dicing" and occurs when the glass has achieved full temper.

In addition to the safety aspect of thermally tempered glass, tempering strengthens the glass, making it more damage resistant and durable. Because of the increased durability, tempered glass can be used in applications where normal glass would quickly break—for example, automotive windows, where the glass may be impacted by rocks or other hard materials. Due to the increase in glass use in architectural, automotive, and electronic device applications, there is a continuing demand for thin, thermally strengthened glasses that are durable, but when broken, break in a 'safe' or dicing break pattern. However, as glass becomes thinner it becomes harder to produce any thermal tempering stresses at all, and the central tension required for a safe "dicing" fracture pattern increases—producing a compound challenge. The present disclosure solves this unmet need by disclosing glasses that produce enhanced temper stresses while needing to reach a lower stress level for dicing to occur.

SUMMARY

In an aspect (1), the disclosure provides a glass composition comprising greater than 70 mol % $SiO_2$, greater than 0 to 20 mol % $Al_2O_3$, greater than 0 to 20 mol % of at least one alkaline, oxide from the group consisting of MgO, CaO, BaO, or SrO, 3-16 mol % $K_2O$, >0-10 mol % $B_2O_3$. In an aspect (2), the disclosure provides the glass composition of aspect (1), comprising 72-90 mol % $SiO_2$. In an aspect (3), the disclosure provides the glass composition of aspect (1) or aspect (2), further comprising 0-16 mol % $Na_2O$ and 3-22 mol % $Na_2O+K_2O$. In an aspect (4), the disclosure provides the glass composition of any of aspect (1)-(3), wherein the low temperature coefficient of thermal expansion from 25-300° C. is greater than $75 \times 10^{-7}$ ppm/° C. In an aspect (5), the disclosure provides the glass composition of any of aspect (1)-(4), wherein the high temperature coefficient of thermal expansion is greater than $250 \times 10^{-7}$ ppm/° C. In an aspect (6), the disclosure provides the glass composition of any of aspect (1)-(5), wherein the fracture toughness, KIC is less than 0.65 MPa-m$^{1/2}$. In an aspect (7), the disclosure provides the glass composition of any of aspect (1)-(6), wherein the glass has a viscosity of 200 kP at a temperature of from 1000-1200° C. In an aspect (8), the disclosure provides the glass composition of any of aspect (1)-(7), wherein the glass has a viscosity of 35 kP at a temperature of from 1100-1300° C. In an aspect (9), the disclosure provides the glass composition of any of aspect (1)-(8), comprising 0.5 to 8 mol % or 1 to 5 mol % $B_2O_3$. In an aspect (10), the disclosure provides the glass composition of any of aspect (1)-(9), comprising >0-10 mol % or 3 to 10 mol % $Al_2O_3$. In an aspect (11), the disclosure provides the glass composition of any of aspect (1)-(10), comprising 2 to 20 mol % or 2 to 15 mol % MO. In an aspect (12), the disclosure provides the glass composition of any of aspect (1)-(11), comprising 8-16 mol % $Na_2O+K_2O$. In an aspect (13), the disclosure provides the glass composition of any of aspect (1)-(12), comprising 5-15 mol % $K_2O$. In an aspect (14), the disclosure provides the glass composition of any of aspects (1)-(13), wherein the glass is thermally tempered and has a depth of compression of at least about 10 microns. In an aspect (15), the disclosure provides the glass composition of any of aspects (1)-(14), wherein the glass is thermally tempered and has a surface compressive stress of at least 250 MPa. In an aspect (16), the disclosure provides the glass composition of any of aspects (1)-(15), wherein the glass meets the dicing standard ASTM C1048.

In an aspect (17), the disclosure provides a method of making the glass composition of any of aspects (1)-(16), the method comprising mixing $SiO_2$, $Al_2O_3$, at least one alkaline earth oxide from the group consisting of MgO, CaO, B aO, or SrO, $K_2O$; and $B_2O_3$ to create a homogenous melt. In an aspect (18), the disclosure provides the method of aspect (17), wherein the melt is formed into glass sheets and the glass sheets are subsequently thermally tempered. In an aspect (19), the disclosure provides the method of aspect (17) or aspect (18), wherein the glass composition is meets the dicing standard ASTM C1048. In an aspect (20), the disclosure provides the method of any of aspects (17)-(19), wherein the glass is melted and maintained at temperatures ranging from 1100-1650° C. for times ranging from about 6-16 hours, and annealed at about 500-650° C., where the glass is held at temperature for about 1 hour and subsequently cooled for at least 6 hours.

DETAILED DESCRIPTION

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. It is noted that the terms "substantially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "free of $Al_2O_3$" is one in which $Al_2O_3$ is not actively added or batched into the glass, but may be present in very small amounts as a contaminant (e.g., 500, 400, 300, 200, or 100 parts per million (ppm) or less or).

Unless otherwise specified, all compositions are expressed in terms of mole percent (mol %). Coefficients of thermal expansion (CTE) are expressed in terms of $10^{-7}/°$ C., unless otherwise specified. The low temperature CTE (LTCTE) is measured over a temperature range from 25° C. to 300° C. and expressed in terms of $10^{-7}/°$ C. The high temperature CTE (HTCTE) is measured at the temperature above glass transition region and expressed in terms of $10^{-7}/°$ C. The sum of the LTCTE and the HTCTE is expressed in terms of $10^{-7}/°$ C. The density in terms of grams/cm$^3$ was measured via the Archimedes method (ASTM C693). Young's modulus, shear modulus, and Poisson's Ratio were measured via the ASTM C623 standard.

Glass Compositions

In thermal tempering, a glass product is heated to near the softening temperature and then rapidly quenched, for example, by blowing cold air on the surfaces. As a result, the glass will possess a lower surface temperature than the interior during cooling. As the center of the glass cools more slowly to room temperature it contracts to a smaller specific volume while the high specific volume of the surface layer remains unchanged. This leads to a surface compressive layer that gives tempered glass its strength. The difference in specific volume is due to a combination of differences in the thermal expansion of the glass upon cooling and from a fictive temperature difference between the surface and the bulk. To a first approximation, the stress distribution in thermally tempered glass can be represented by a simple parabola, with the magnitude of the surface compressive stress approximately equal to twice the center tension.

When thermally tempered glass breaks, unlike annealed glass, it shatters into rock-salt like pieces which do not have sharp edges or needle-like shapes. This behavior is particularly useful for situations where safe fracture behavior is necessary and it is for this reason that characterizing the fracture behavior of thermally tempered glass is of paramount importance. The desired fracture behavior is called "dicing" and occurs when the glass has achieved full temper. The dicing threshold of tempered glass is a somewhat arbitrarily defined fracture behavior which can be considered "safe" to the user in the event of glass failure. Standards for dicing thresholds exist worldwide, such as ASTM C1048 and ANSI Z97.1 in the United States, EN12150-1 in Europe, GOST 5727-88 in Russia, JIS R 3206 in Japan, and GB 15763.2 in China (all of which are hereby incorporated by reference). The standards across countries are similar in that they generally state a fragmented piece of tempered soda-lime glass is required to contain at least 30-40 fragments in an area of 50 mm×50 mm (1.6 fragments/cm$^2$) for thick glasses (>3 mm), while Japanese standards in particular require at least 60 fragments in the case of thinner glass.

The glasses disclosed herein have high coefficients of thermal expansion and can be used with a thermal tempering process to obtain improved fracture behavior when compared to commercially available thin glasses. The glasses described herein are needed to satisfy a growing demand for stronger but thinner thermally strengthened glasses for commercial electronics, automotive and architectural applications where durability and/or scratch resistance are desired along with a "safe" break pattern. Additionally, the glasses must also retain a significant chemical durability, as they will likely be exposed to the elements for extended periods of time.

It has been found herein that in order for thin glasses (3 mm or less, 2 mm or less, or 1 mm or less) to be thermally temperable and retain the desired fracture pattern, the low temperature coefficient of thermal expansion (LTCTE) should be $75×10^{-7}/°$ C. or greater and the high temperature coefficient of thermal expansion (HTCTE) should be $250× 10^{-7}/°$ C. or greater. In some embodiments, it has been found that in addition to the LTCTE and the HTCTE limitations, the glass must also have a fracture toughness ($K_{IC}$) is less than 0.65 MPa·m$^{1/2}$.

In some embodiments, the glass comprises a combination of $SiO_2$, $K_2O$, $Al_2O_3$, $B_2O_3$, and alkaline earth oxides. For example, embodiments may comprise greater than 70 mol % $SiO_2$, greater than 0 mol % $Al_2O_3$, greater than 0 mol % $B_2O_3$, greater than 3 mol % $K_2O$, and greater than 0 mol % MO, where M is Ca, Ba, Sr, or Mg. In some embodiments, the glass may comprise greater than 72 mol % $SiO_2$, >0 to 10 mol % $Al_2O_3$, 0.5 to 5 mol % $B_2O_3$, 3 to 20 mol % $K_2O$, and 2 to 20 mol % MO, where M is Ca, Ba, Sr, or Mg. In other embodiments, the glass may comprise 72 to 90 mol % $SiO_2$, 3 to 10 mol % $Al_2O_3$, 1 to 5 mol % $B_2O_3$, 8 to 18 mol % $K_2O$, and 2 to 15 mol % MO, where M is Ca, Ba, Sr, or Mg.

$SiO_2$, which is the largest oxide component of the embodied glasses, maybe included to provide high temperature stability and chemical durability. In some embodiments, the glass can comprise 70 mol % or greater $SiO_2$. In some embodiments, the glass can comprise 72 mol % or greater $SiO_2$. In some embodiments, the glass can comprise 72 to 90 mol % $SiO_2$. In some embodiments, the glass can comprise from 75 to 90 mol % $SiO_2$. In some embodiments, the glass can comprise 70 to 92 mol %, 70 to 90 mol %, 70 to 85 mol %, 70 to 80 mol %, 72 to 92 mol %, 72 to 90 mol %, 72 to 85 mol %, 72 to 80 mol %, 75 to 92 mol %, 75 to 90 mol %, 75 to 85 mol %, or 75 to 80 mol % $SiO_2$. In some embodiments, the glass comprises 70, 71, 72, 73, 74, 75, 76, 77, 78, 79, 80, 81, 82, 83, 84, 85, 86, 87, 88, 89, 90, 91 or 92 mol % $SiO_2$.

$Al_2O_3$ may influence the structure of the glass and, additionally, lower the liquidus temperature and coefficient of thermal expansion, or enhance the strain point. In some embodiments, the glass can comprise greater than 0 mol % $Al_2O_3$. In some embodiments, the glass can comprise from >0 to 20 mol % $Al_2O_3$. In some embodiments, the glass can comprise from >0 to 10 mol %, 3 to 10 mol %, or 5 to 10 mol % $Al_2O_3$. In some embodiments, the glass can comprise from >0 to 20 mol %, >0 to 18 mol %, >0 to 15 mol %, >0 to 12 mol %, >0 to 10 mol %, >0 to 8 mol %, 1 to 20 mol %, 1 to 18 mol %, 1 to 15 mol %, 1 to 12 mol %, 1 to 10 mol %, 1 to 8 mol %, 3 to 20 mol %, 3 to 18 mol %, 3 to 15 mol %, 3 to 12 mol %, 3 to 10 mol %, 3 to 8 mol %, 5 to 20 mol %, 5 to 18 mol %, 5 to 15 mol %, 5 to 12 mol %, 5 to 10 mol %, 5 to 8 mol %, 7 to 20 mol %, 7 to 18 mol %, 7 to 15 mol %, 7 to 12 mol %, or 7 to 10 mol % $Al_2O_3$. In some embodiments, the glass can comprise about >0, 1, 2, 3, 4, 5, 6, 7, 8, 9, 10, 11 12, 13, 14, 15, 16, 17, 18, 19, or 20 mol % $Al_2O_3$.

Without being bound by theory, it is believed that incorporating $B_2O_3$ into the glasses described herein impacts the coefficient of thermal expansion, especially at high temperatures, and improves the temperability of the glasses. In some embodiments, when present, the glass can comprise >0 mol % to 10 mol % $B_2O_3$. In some embodiments, the glass can comprise from 0.5 to 10 mol %, 0.5 mol % to 8 mol % or from 1 mol % to 6 mol % $B_2O_3$. In some embodiments, the glass can comprise from 1 to 5 mol % $B_2O_3$. In some embodiments, the glass can comprise from >0 to 10 mol %, >0 to 8 mol %, >0 to 6 mol %, >0 to 5 mol %, >0 to 4 mol %, 0.5 to 10 mol %, 0.5 to 8 mol %, 0.5 to 6 mol %, 0.5 to 5 mol %, 0.5 to 4 mol %, 1 to 10 mol %, 1 to 8 mol %, 1 to 6 mol %, 1 to 5 mol %, 1 to 4 mol %, 2 to 10 mol %, 2 to 8 mol %, 2 to 6 mol %, 2 to 5 mol %, or 2 to 4 mol %. In some embodiments, the glass can comprise about 0, >0, 0.5, 1, 1.5, 2, 3, 4, 5, 6, 7, 8, 9, or 10 mol % $B_2O_3$.

Alkaline earth oxides may improve desirable properties in the materials, including influencing the Young's modulus and the coefficient of thermal expansion. In some embodiments, the glass comprises from >0 mol % to about 20 mol % MO (0 mol %<MO≤20 mol %), where M is the sum of the alkaline earth metals Mg, Ca, Sr, and Ba, in the glass. In some embodiments, the glass can comprise from 2 to 20 mol % MO. In some embodiments, the glass can comprise from 2 to 15 mol % MO. In some embodiments, the glass can comprise about >0, 1, 2, 3, 4, 5, 6, 7, 8, 9, 10, 11, 12, 13, 14, 15, 16, 17, 18, 19, or 20 mol % MO.

In some embodiments, the glasses comprise MgO, CaO, or SrO. In some embodiments, the glass can comprise greater than 0 mol % MgO. In some embodiments, the glass can comprise from >0 to 10 mol % MgO. In some embodiments, the glass can comprise from 3 to 10 mol %, 5 to 10 mol %, 5 to 8 mol % MgO. In some embodiments, the glass can comprise from >0 to 10 mol %, >0 to 8 mol %, >0 to 6 mol %, >0 to 4 mol %, >0 to 2 mol %, 1 to 10 mol %, 1 to 8 mol %, 1 to 6 mol %, 1 to 4 mol %, 1 to 2 mol %, 3 to 8 mol %, 3 to 6 mol %, 3 to 10 mol %, 5 to 8 mol %, 5 to 10 mol %, 7 to 10 mol %, or 8 to 10 mol % MgO. In some embodiments, the glass can comprise about >0, 1, 2, 3, 4, 5, 6, 7, 8, 9, or 10 mol % MgO.

In some embodiments, the glass can comprise greater than 0 mol % CaO. In some embodiments, the glass can comprise from >0 to 15 mol % CaO. In some embodiments, the glass can comprise from >0 to 5 mol %, 6 to 13 mol %, 5 to 15 mol %, 7 to 13 mol %, 7 to 11 mol %, 8 to 12 mol % CaO. In some embodiments, the glass can comprise from >0 to 15 mol %, >0 to 13 mol %, >0 to 11 mol %, >0 to 9 mol %, >0 to 7 mol %, >0 to 5 mol %, 1 to 15 mol %, 1 to 13 mol %, 1 to 11 mol %, 1 to 9 mol %, 1 to 7 mol %, 1 to 5 mol %, 3 to 15 mol %, 3 to 13 mol %, 3 to 11 mol %, 3 to 9 mol %, 3 to 7 mol %, 3 to 5 mol %, 5 to 15 mol %, 5 to 13 mol %, 5 to 11 mol %, 5 to 9 mol %, 5 to 7 mol %, 7 to 15 mol %, 7 to 13 mol %, 7 to 11 mol %, 7 to 9 mol %, 9 to 15 mol %, 9 to 13 mol %, 9 to 11 mol %, 11 to 15 mol %, or 11 to 13 mol % CaO. In some embodiments, the glass can comprise about >0, 1, 2, 3, 4, 5, 6, 7, 8, 9, 10, 11, 12, 13, 14, or 15 mol % CaO.

SrO may be present in some embodiments and in such embodiments, the glass can comprise from 0 to 10 mol % SrO. In some embodiments, the glass can comprise from >0 to 10 mol % SrO. In some embodiments, the glass can comprise from 3 to 10 mol %, 5 to 10 mol %, 5 to 8 mol % SrO. In some embodiments, the glass can comprise from >0 to 10 mol %, >0 to 8 mol %, >0 to 6 mol %, >0 to 4 mol %, >0 to 2 mol %, 1 to 10 mol %, 1 to 8 mol %, 1 to 6 mol %, 1 to 4 mol %, 1 to 2 mol %, 3 to 8 mol %, 3 to 6 mol %, 3 to 10 mol %, 5 to 8 mol %, 5 to 10 mol %, 7 to 10 mol %, or 8 to 10 mol % SrO. In some embodiments, the glass can comprise about >0, 1, 2, 3, 4, 5, 6, 7, 8, 9, or 10 mol % SrO.

BaO may be present in some embodiments and in such embodiments, the glass can comprise from 0 to 15 mol % BaO. In some embodiments, the glass can comprise from 0 to 10 mol %, >0 to 5 mol %, 6 to 13 mol %, 5 to 15 mol %, 7 to 13 mol %, 7 to 11 mol %, 8 to 12 mol % BaO. In some embodiments, the glass can comprise from >0 to 15 mol %, >0 to 13 mol %, >0 to 11 mol %, >0 to 9 mol %, >0 to 7 mol %, >0 to 5 mol %, 1 to 15 mol %, 1 to 13 mol %, 1 to 11 mol %, 1 to 9 mol %, 1 to 7 mol %, 1 to 5 mol %, 3 to 15 mol %, 3 to 13 mol %, 3 to 11 mol %, 3 to 9 mol %, 3 to 7 mol %, 3 to 5 mol %, 5 to 15 mol %, 5 to 13 mol %, 5 to 11 mol %, 5 to 9 mol %, 5 to 7 mol %, 7 to 15 mol %, 7 to 13 mol %, 7 to 11 mol %, 7 to 9 mol %, 9 to 15 mol %, 9 to 13 mol %, 9 to 11 mol %, 11 to 15 mol %, or 11 to 13 mol % BaO. In some embodiments, the glass can comprise about >0, 1, 2, 3, 4, 5, 6, 7, 8, 9, 10, 11, 12, 13, 14, or 15 mol % BaO.

$Na_2O$ and $K_2O$ may improve the temperability of the glass and influence the coefficient of thermal expansion, especially at low temperatures. In some embodiments, the glass can comprise from 0 to 10 mol % $Na_2O$. In some embodiments, the glass can comprise >0 to 10 mol % $Na_2O$. In some embodiments, the glass can comprise 0 to 8 mol % $Na_2O$. In some embodiments, the glass can comprise 2 to 6 mol % $Na_2O$. In some embodiments, the glass can comprise from 0 to 10 mol %, 0 to 8 mol %, 0 to 6 mol %, 0 to 4 mol %, 0 to 2 mol %, >0 to 10 mol %, >0 to 8 mol %, >0 to 6 mol %, >0 to 4 mol %, >0 to 2 mol %, 2 to 10 mol %, 2 to 8 mol %, 2 to 6 mol %, 2 to 4 mol %, 5 to 16 mol %, 5 to 10 mol %, 5 to 8 mol %, or 8 to 10 mol % Na$_2$O. In some embodiments, the glass can comprise 0, >0, 1, 2, 3, 4, 5, 6, 7, 8, 9, or 10 mol % Na$_2$O.

In some embodiments, the glass can comprise from 3 to 20 mol % K$_2$O. In some embodiments, the glass can comprise 5 to 18 mol % K$_2$O. In some embodiments, the glass can comprise 8 to 12 mol % K$_2$O. In some embodiments, the glass can comprise from 3 to 20 mol %, 3 to 18 mol %, 3 to 15 mol %, 3 to 12 mol %, 3 to 10 mol %, 3 to 8 mol %, 5 to 20 mol %, 5 to 18 mol %, 5 to 15 mol %, 5 to 12 mol %, 5 to 10 mol %, 5 to 8 mol %, 8 to 20 mol %, 8 to 18 mol %, 8 to 15 mol %, 8 to 12 mol %, 8 to 10 mol %, 10 to 20 mol %, 10 to 18 mol %, 10 to 15 mol %, 10 to 12 mol %, 12 to 20 mol %, 12 to 18 mol %, or 12 to 15 mol % K$_2$O. In some embodiments, the glass can comprise 0, >0, 1, 2, 3, 4, 5, 6, 7, 8, 9, 10, 11, 12, 13, 14, 15, 16, 17, 18, 19, or 20 mol % K$_2$O.

In some embodiments, Li$_2$O may be present and in such embodiments, the glass can comprise from 0 to 5 mol % Li$_2$O. In some embodiments, the glass can comprise from >0 to 5 mol % Li$_2$O. In some embodiments, the glass can comprise from about >0 to 3.5 mol % Li$_2$O or 0.2 to 3 mol % Li$_2$O. In some embodiments, the glass can comprise from 1 to 4 mol % Li$_2$O. In some embodiments, the glass can comprise from 0.2 to 5 mol %, 0.2 to 4 mol %, 0.2 to 3 mol %, 0.2 to 2 mol %, >0 to 5 mol %, >0 to 4 mol %, >0 to 3 mol %, >0 to 2 mol %, 1 to 5 mol %, 1 to 4 mol %, or 1 to 3 mol % Li$_2$O. In some embodiments, the glass can comprise about 0, >0, 1, 2, 3, 4, or 5 mol % Li$_2$O.

In some embodiments, the total amount of the alkalis Na$_2$O and K$_2$O or Li$_2$O, Na$_2$O, and K$_2$O is important to the glass properties. In some embodiments, the glass can comprise 3 to 22 mol % Na$_2$O+K$_2$O or Li$_2$O+Na$_2$O+K$_2$O. In some embodiments, the glass can comprise 5 to 20 mol % Na$_2$O+K$_2$O or Li$_2$O+Na$_2$O+K$_2$O. In some embodiments, the glass can comprise 5 to 15 mol % Na$_2$O+K$_2$O or Li$_2$O+Na$_2$O+K$_2$O. In some embodiments, the glass can comprise 8 to 16 mol % Na$_2$O+K$_2$O or Li$_2$O+Na$_2$O+K$_2$O. In some embodiments, the glass can comprise 9 to 14 mol % Na$_2$O+K$_2$O or Li$_2$O+Na$_2$O+K$_2$O. In some embodiments, the glass can comprise from 3 to 22 mol %, 5 to 22 mol %, 8 to 22 mol %, 3 to 20 mol %, 5 to 20 mol %, 8 to 20 mol %, 3 to 15 mol %, 5 to 15 mol %, 8 to 15 mol %, 3 to 12 mol %, 5 to 12 mol %, or 8 to 12 mol % Na$_2$O+K$_2$O or Li$_2$O+Na$_2$O+K$_2$O. In some embodiments, the glass can comprise 3, 4, 5, 6, 7, 8, 9, 10, 11, 12, 13, 14, 15, 16, 17, 18, 19, 20, 21, or 22 mol % Na$_2$O+K$_2$O or Li$_2$O+Na$_2$O+K$_2$O.

Additional components can be incorporated into the glass to provide additional benefits or may be incorporated as contaminants typically found in commercially-prepared glass. For example, additional components can be added as coloring or fining agents (e.g., to facilitate removal of gaseous inclusions from melted batch materials used to produce the glass) and/or for other purposes. In some embodiments, the glass may comprise one or more compounds useful as ultraviolet radiation absorbers. In some embodiments, the glass can comprise 3 mol % or less ZnO, TiO$_2$, CeO, MnO, Nb$_2$O$_5$, MoO$_3$, Ta$_2$O$_5$, WO$_3$, SnO$_2$, Fe$_2$O$_3$, As$_2$O$_3$, Sb$_2$O$_3$, Cl, Br, or combinations thereof. In some embodiments, the glass can comprise from 0 to about 3 mol %, 0 to about 2 mol %, 0 to about 1 mol %, 0 to 0.5 mol %, 0 to 0.1 mol %, 0 to 0.05 mol %, or 0 to 0.01 mol % ZnO, TiO$_2$, CeO, MnO, Nb$_2$O$_5$, MoO$_3$, Ta$_2$O$_5$, WO$_3$, SnO$_2$, Fe$_2$O$_3$, As$_2$O$_3$, Sb$_2$O$_3$, Cl, Br, or combinations thereof. The glasses, according to some embodiments, can also include various contaminants associated with batch materials and/or introduced into the glass by the melting, fining, and/or forming equipment used to produce the glass. For example, in some embodiments, the glass can comprise from 0 to about 3 mol %, 0 to about 2 mol %, 0 to about 1 mol %, 0 to about 0.5 mol %, 0 to about 0.1 mol %, 0 to about 0.05 mol %, or 0 to about 0.01 mol % SnO$_2$ or Fe$_2$O$_3$, or combinations thereof.

Non-limiting examples of amounts of precursor oxides for forming the embodied glasses are listed in Table 1, along with the properties of the resulting glasses.

TABLE 1

| Analyzed mol % | Glass A | Glass B | Glass C | Glass D | Glass E |
|---|---|---|---|---|---|
| SiO$_2$ | 76.60 | 75.29 | 75.11 | 75.75 | 76.10 |
| B$_2$O$_3$ | 1.88 | 2.35 | 2.57 | 2.15 | 2.41 |
| Al$_2$O$_3$ | 6.32 | 7.06 | 7.00 | 6.07 | 6.03 |
| K$_2$O | 11.61 | 12.32 | 11.41 | 11.08 | 11.11 |
| CaO | 0.00 | 0.00 | 0.00 | 0.00 | 0.00 |
| SrO | 3.84 | 2.93 | 3.86 | 4.89 | 3.87 |
| P$_2$O$_5$ | 0.00 | 0.00 | 0.00 | 0.00 | 0.42 |
| SnO$_2$ | 0.05 | 0.05 | 0.05 | 0.05 | 0.05 |
| LTCTE (ppm/° C.) | 7.87 | 7.80 | 7.71 | 7.69 | — |
| HTCTE (ppm/° C.) | — | 27.31 | 28.54 | 27.12 | — |
| K$_{IC}$ (MPa-m$^{1/2}$) | 0.55 | — | 0.65 | 0.62 | — |
| Density (g/cm$^3$) | 2.471 | 2.456 | 2.471 | 2.492 | — |
| Strain Pt (° C.) | 600 | 607 | 610 | 611 | — |
| Anneal Pt (° C.) | 652 | 658 | 662 | 662 | — |
| Softening Pt (° C.) | 876 | 889 | 890 | 882 | — |
| SOC (TPa$^{-1}$) | 2.965 | 3.121 | 3.049 | 3.015 | — |
| Refractive Index | 1.5005 | 1.5005 | 1.5019 | 1.5038 | — |
| 200 Poise temperature (° C.) | 1720 | 1762 | 1758 | 1706 | 1762 |
| 35000 Poise temperature (° C.) | 1172 | 1190 | 1204 | 1181 | 1195 |
| 200000 Poise temperature (° C.) | 1072 | 1085 | 1099 | 1080 | 1107 |

| Analyzed mol % | Glass F | Glass G | Glass H | Glass I | Glass J |
|---|---|---|---|---|---|
| SiO$_2$ | 75.64 | 76.00 | 75.83 | 75.35 | 75.35 |
| B$_2$O$_3$ | 2.25 | 2.10 | 2.29 | 2.34 | 1.58 |
| Al$_2$O$_3$ | 6.05 | 6.04 | 6.02 | 6.00 | 6.00 |

TABLE 1-continued

| | | | | | |
|---|---|---|---|---|---|
| $K_2O$ | 12.01 | 11.94 | 11.81 | 12.18 | 13.18 |
| CaO | 4.01 | 0.00 | 0.00 | 0.00 | 0.00 |
| SrO | 0.00 | 3.84 | 3.89 | 3.86 | 3.85 |
| $P_2O_5$ | 0.00 | 0.04 | 0.11 | 0.22 | 0.00 |
| $SnO_2$ | 0.05 | 0.05 | 0.05 | 0.05 | 0.05 |
| LTCTE (ppm/° C.) | 7.82 | 7.85 | 7.78 | 7.91 | 8.33 |
| HTCTE (ppm/° C.) | 27.68 | 24.72 | 27.08 | 26.88 | 27.21 |
| $K_{IC}$ (MPa-m$^{1/2}$) | 0.59 | 0.67 | 0.62 | — | 0.63 |
| Density (g/cm$^3$) | 2.415 | 2.476 | 2.475 | 2.476 | 2.480 |
| Strain Pt (° C.) | 615 | 598 | 602 | 599 | 586 |
| Anneal Pt (° C.) | 667 | 649 | 654 | 649 | 638 |
| Softening Pt (° C.) | 887 | 872.2 | 870.8 | 875.3 | 858.3 |
| SOC (TPa$^{-1}$) | 3.050 | 2.976 | 3.011 | 2.967 | 2.951 |
| Refractive Index | 1.5012 | 1.5029 | 1.5022 | 1.5018 | 1.5030 |
| 200 Poise temperature (° C.) | 1721 | 1695 | 1715 | 1684 | 1684 |
| 35000 Poise temperature (° C.) | 1185 | 1162 | 1162 | 1157 | 1148 |
| 200000 Poise temperature (° C.) | 1084 | 1062 | 1063 | 1057 | 1049 |

As noted above, the embodied glasses of one or more embodiments may exhibit a color. In some embodiments, it is desirable for the glass to have a green-yellow to gold to amber color. In particular embodiments, these colors may be combined with the blue color of a crystalline silicon photovoltaic cell to create a dark blue to black color that is aesthetically pleasing. In some embodiments, the glasses exhibit a color presented in SCE color space coordinates (determined from reflectance spectra measurements using a spectrophotometer, with illuminant D65 and specular reflectance excluded), with the following ranges: a*=from about −10 to about 30; b*=from about 0 to about 30; and L*>80 for a glass having a thickness of 2.7 mm. In some embodiments, the glasses exhibit a color presented in SCI color space coordinates of a*=from about −5 to about −1; b*=from about 5 to about 18; and L*>83 for a glass having a thickness of 2.7 mm. In some applications, the combination of the photovoltaic cell and the glass combine to produce a desired color. In such application, the SCE color space coordinates (determined from reflectance spectra measurements using a spectrophotometer, with illuminant D65 and specular reflectance excluded) of the combination of the glass and the photovoltaic cell may comprise the following ranges: a*=from about 0 to about 10; b*=from about −15 to about 0; and L* from about 10 to about 50.

In some embodiments, the glass can be strengthened via thermal or chemical tempering. In some embodiments, the glass can be strengthened to include compressive stress (CS) that extends from a surface thereof to a depth of compression (DOC). The compressive stress regions are balanced by a central portion exhibiting a tensile stress. At the DOC, the stress crosses from a positive (compressive) stress to a negative (tensile) stress. Such strengthening methods comprise both thermal tempering and chemical tempering.

The glasses described herein are particularly capable of being thermally tempered. The process of thermal tempering is well known in the art. To thermally temper a glass article, the article is heated to near the softening temperature and then rapidly cooled or quenched. As a result, the glass will possess a lower surface temperature than the interior during cooling. The temperature difference is maintained until the surface of the glass cools to at least its strain point or lower, such as room temperature. Because the center of the glass cools more slowly, it contracts to a smaller specific volume while the high specific volume of the surface layer remains unchanged. This leads to a surface compressive layer that gives tempered glass its strength. The difference in specific volume is, in part, due to differences in the thermal expansion of the glass upon cooling, while to a lesser extent from a fictive temperature difference between the surface and the bulk. To a first approximation, the stress distribution in thermally tempered glass can be represented by a simple parabola, with the magnitude of the surface compressive stress approximately equal to twice the center tension.

As an alternative to thermal tempering, the glasses disclosed herein may b e ion exchanged by immersion in at least one ion exchange bath containing molten salts (e.g., nitrates, sulfides, halides, or the like) of at least one alkali metal such as lithium, sodium, or potassium. Ion exchange is commonly used to chemically strengthen glasses. In one particular example, alkali cations within a source of such cations (e.g., a molten salt, or "ion exchange," bath) are exchanged with smaller alkali cations within the glass to achieve a layer under a compressive stress (CS) extending from the surface of the glass to a depth of compression (DOC) within the glass phase. For example, potassium ions from the cation source are often exchanged with sodium and/or lithium ions within the glass phase, and the K$^+$ concentration profile correlates with the compressive stress and depth of layer. The ion exchange bath may contain a salt (or salts) of a single alkali metal (e.g., sulfides, nitrates, or halides of Li, Na, or K) or salts of two or more alkali metals (e.g., sulfides, nitrates, or halides of Li and Na, or sulfides, nitrates, or halides of Na and K). Ion exchange is carried out in the ion exchange bath at temperatures ranging from about 390° C. to about 550° C. for times ranging from about 0.5 hour to about 24 hours.

The glass, in some embodiments, is ion exchanged and has a compressive layer extending from a surface to a depth of compression (DOC) of at least ab out 10 μm or, in some embodiments, at least about 30 μm into the glass, or in some embodiments up to about 10, 15, 20 or 25% into the glass as measured by thickness (surface to center). In some embodiments, the compressive layer extends from the surface of the glass to a depth of up to about 20% of the thickness of the glass. In some embodiments, the glass may be strengthened to exhibit a surface compressive stress in a range from 250 MPa to 800 MPa or greater.

In the strengthened glass, the depth of the compressive layer may be determined by electron microprobe, glow-discharge optical emission spectroscopy (GDOES, which is a technique for measuring depth profiles of constituent elements in a solid sample by detecting emissions from atoms accommodated in plasma by sputtering), or similar techniques that can provide composition data as a function of depth, where data would show incorporation of Na (where Na$^+$ replaces Li$^+$ in the glass phase) and/or K at the surfaces. The DOC of a precursor glass may be measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. CS may also be measured by measured by FSM. As used herein CS may be the "maximum compressive stress" which is the highest compressive stress value measured within the compressive stress layer. In some embodiments, the maximum compressive stress is located at the surface of the glass. In other embodiments, the maximum compressive stress may occur at a depth below the surface, giving the compressive profile the appearance of a "buried peak."

The thermally or chemically strengthened glasses or articles disclosed herein may be incorporated into another article such as an article with a display (or display articles) (e.g., consumer electronics, including mobile phones, tablets, computers, navigation systems, and the like), architectural articles (e.g., windows, skylights, shingles), transportation articles (e.g., automotive, trains, aircraft, sea craft, etc.), appliance articles, or any article that would benefit from transparency, scratch-resistance, abrasion resistance or a combination thereof. In other embodiments, the glass forms a portion of a consumer electronic product, such as a cellular phone or smart phone, laptop computer, tablet, or the like. Such consumer electronic products typically comprise a housing having front, back, and side surfaces, and include electrical components such as a power source, a controller, a memory, a display, and the like, which are at least partially internal to the housing. In some embodiments, the glass described herein comprises at least a portion of a protective element, such as, but not limited to, the housing and/or display of a consumer electronic product.

Processes for Making Glasses

Glasses having the oxide contents listed in Table 1 can be made via traditional methods. For example, in some embodiments, the precursor glasses can b e formed by thoroughly mixing the requisite batch materials (for example, using a turbular mixer) in order to secure a homogeneous melt, and subsequently placing into silica and/or platinum crucibles. The crucibles can be placed into a furnace and the glass batch melted and maintained at temperatures ranging from 1250-1650° C. for times ranging from about 6-16 hours. The melts can thereafter be poured into steel molds to yield glass slabs. Subsequently, those slabs can be transferred immediately to an annealer operating at about 500-650° C., where the glass is held at temperature for about 1 hour and subsequently cooled overnight. In another non-limiting example, precursor glasses are prepared by dry blending the appropriate oxides and mineral sources for a time sufficient to thoroughly mix the ingredients. The glasses are melted in platinum crucibles at temperatures ranging from about 1100° C. to about 1650° C. and held at temperature for about 16 hours. The resulting glass melts are then poured onto a steel table to cool. The precursor glasses are then annealed at appropriate temperatures.

Tempering of the embodied glasses was achieved using conventional processes wherein the glasses were heated in a radiant energy furnace or a convection furnace (or a "combined mode" furnace using both techniques) to a predetermined temperature, then gas cooling ("quenching"), typically via convection by blowing large amounts of ambient air against or along the glass surface.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A method of making a glass article, comprising:
   mixing and melting batch constituents comprising:
      from 75 to 90 mol % $SiO_2$;
      from 7 to 20 mol % $Al_2O_3$;
      greater than 0 to 20 mol % of at least one alkaline earth oxide selected from the group consisting of MgO, CaO, BaO, or SrO;
      from 8 to 20 mol % $K_2O$;
      greater than 0 to 10 mol % $B_2O_3$, and
      0 mol % $Na_2O$ to form a melt of the glass,
   wherein a low temperature coefficient of thermal expansion from 25° C. to 300° C. of the glass is greater than 75×10$^{-7}$ ppm/° C., and
   wherein a fracture toughness, $K_{IC}$ of the glass is less than 0.65 MP·m$^{1/2}$.

2. The method of claim 1, further comprising forming the melt into glass sheets.

3. The method of claim 2, further comprising thermally tempering the glass sheets.

4. The method of claim 3, further comprising maintaining the melt at temperatures ranging from 1100-1650° C. for times ranging from about 6-16 hours, wherein the glass sheets meet dicing standard ASTM C1048 after the thermal tempering.

5. The method of claim 4, further comprising annealing the glass sheets at about 500-650° C.

6. The method of claim 5, wherein during the annealing the glass is held at temperature for about 1 hour and subsequently cooled for at least 6 hours.

7. The method of claim 1, wherein a high temperature coefficient of thermal expansion of the glass is greater than 250×10$^{-7}$ ppm/° C.

8. The method of claim 1, wherein the glass has a viscosity of 200 kP at a temperature within a range of 1000-1200° C.

9. The method of claim 1, wherein the glass has a viscosity of 35 kP at a temperature within a range of 1100-1300° C.

10. The method of claim 1, wherein the mixing comprises mixing from 0.5 to 8 mol % $B_2O_3$.

11. The method of claim 1, wherein the mixing comprises mixing from 2 to 20 mol % MgO.

12. The method of claim 1, wherein the mixing comprises mixing from 11 to 20 mol % $K_2O$.

13. The method of claim 1, wherein the glass has a surface compressive stress of at least 250 MPa.

14. The method of claim 1, wherein the glass meets the dicing standard ASTM C1048.

15. The method of claim 3, wherein the glass has a depth of compression of at least about 10 microns, and the depth of compression extends up to about 25% into the glass as measured by thickness from surface to a center of the glass.

16. The method of claim 1, wherein the mixing comprises mixing:
from 7 to 17 mol % $Al_2O_3$;
from 0 to 10 mol % of the at least one alkaline earth oxide; and
from 8 to 18 mol % $K_2O$.

17. The method of claim 1, wherein
the mixing comprises mixing 0 mol % CaO.

18. A method of making a glass article, comprising:
mixing and melting batch constituents comprising:
from 75 to 90 mol % $SiO_2$;
from 7 to 20 mol % $Al_2O_3$;
greater than 0 to 20 mol % of at least one alkaline earth oxide selected from the group consisting of MgO, CaO, BaO, or SrO;
from 8 to 20 mol % $K_2O$; and
greater than 0 to 2.57 mol % $B_2O_3$ to form a melt of the glass,
wherein the glass exhibits a 200 Poise temperature that is within a range of from 1684° C. to 1762° C.

19. The method of claim 1, wherein
the mixing comprises mixing from greater than 0 to 2.57 mol % $B_2O_3$.

20. The method of claim 18, wherein
the mixing comprises mixing from 12 to 20 mol % $K_2O$, and
the glass exhibits a 200 Poise temperature that is within a range of 1700° C. to 1762° C.

* * * * *